US012634980B2

(12) United States Patent
Fu et al.

(10) Patent No.: US 12,634,980 B2
(45) Date of Patent: May 19, 2026

(54) METHOD FOR INFORMATION TRANSMISSION AND DEVICE

(71) Applicant: Samsung Electronics Co., Ltd., Suwon-si (KR)

(72) Inventors: Jingxing Fu, Beijing (CN); Miao Zhou, Beijing (CN); Feifei Sun, Beijing (CN); Min Wu, Beijing (CN); Yi Wang, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 17/756,035

(22) PCT Filed: Nov. 16, 2020

(86) PCT No.: PCT/KR2020/016077
§ 371 (c)(1),
(2) Date: May 13, 2022

(87) PCT Pub. No.: WO2021/096323
PCT Pub. Date: May 20, 2021

(65) Prior Publication Data
US 2022/0408450 A1     Dec. 22, 2022

(30) Foreign Application Priority Data

Nov. 15, 2019    (CN) .......................... 201911121754.1
Nov. 22, 2019    (CN) .......................... 201911155594.2
(Continued)

(51) Int. Cl.
*H04W 72/543*     (2023.01)
*H04W 28/26*     (2009.01)
(Continued)

(52) U.S. Cl.
CPC ......... *H04W 72/543* (2023.01); *H04W 28/26* (2013.01); *H04W 72/02* (2013.01); *H04W 72/0446* (2013.01); *H04W 74/0808* (2013.01)

(58) Field of Classification Search
None
See application file for complete search history.

(56) References Cited

U.S. PATENT DOCUMENTS 11,477,836 B2 *  10/2022  Hong .................... H04W 36/36
2009/0168688 A1     7/2009  Lim et al.
(Continued)

FOREIGN PATENT DOCUMENTS

CN     101729122 A     6/2010
CN     104023369 A     9/2014
(Continued)

OTHER PUBLICATIONS

Author Unknown, QoS Considerations for the L2 Relay Architecture, Doc. No. R2-1700796, pp. 1-3, February (Year: 2017).*
(Continued)

*Primary Examiner* — Christopher M Crutchfield

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An embodiment of the present application provides a method for information transmission and device. The method is applied to a first node. The method includes: obtaining, from a second node, a latency requirement of information to be forwarded and the information to be forwarded; and forwarding, to a third node, the information to be forwarded according to the latency requirement of information to be forwarded. In the present application the first node forwards the information to be forwarded to the third node according to the latency requirement of the
(Continued)

Time domain →

Frequency domain ↓
llnk resource

PSSCH TB1    PSSCH TB1    PSSCH TB2

Relay node forwards directly without decoding after receiving each PSSCH transmission Time domain →

□ PSSCH transmitted from

▨ PSSCH forwarded from

Frequency domain ↓
llnk resource

PSSCH TB1    PSSCH TB1    PSSCH TB2

Relay node directly forwards N=1 transmissions without decoding after receiving every M=2 PSSCH transmissions information to be forwarded, thereby satisfying the needs of services with higher latency requirements.

Provided is a method and device for transmitting a PUSCH. The method for transmitting the PUSCH includes: performing a predetermined measurement; determining parameters for transmitting the PUSCH according to a measurement result of the predetermined measurement; and transmitting the PUSCH based on the parameters for transmitting the PUSCH, thus adjustment of the PUSCH transmission parameters and improved performance of the PUSCH can be achieved.

10 Claims, 14 Drawing Sheets

(30) Foreign Application Priority Data

| Aug. 21, 2020 | (CN) | .......................... 202010852408.7 |
| Aug. 24, 2020 | (CN) | .......................... 202010859357.0 |

(51) Int. Cl.

| H04W 72/02 | (2009.01) |
| H04W 72/0446 | (2023.01) |
| H04W 74/0808 | (2024.01) |

(56) References Cited

U.S. PATENT DOCUMENTS

| 2009/0201900 | A1 | 8/2009 | Suga | |
| 2011/0292867 | A1 | 12/2011 | Lim et al. | |
| 2013/0028127 | A1* | 1/2013 | Zheng | H04L 43/0852 370/252 |
| 2014/0113545 | A1* | 4/2014 | Shin | H04B 7/15557 455/7 |
| 2014/0341031 | A1* | 11/2014 | Mutikainen | H04W 28/0268 370/235 |
| 2015/0049664 | A1* | 2/2015 | Gora | H04W 84/047 370/315 |
| 2016/0143002 | A1 | 5/2016 | Lindoff et al. | |
| 2016/0338094 | A1 | 11/2016 | Faurie et al. | |
| 2017/0295104 | A1 | 10/2017 | Hampel et al. | |
| 2018/0213376 | A1 | 7/2018 | Pinheiro et al. | |
| 2018/0279319 | A1* | 9/2018 | Yu | H04W 40/12 |
| 2019/0081696 | A1* | 3/2019 | Kalhan | H04B 7/15557 |
| 2019/0223108 | A1 | 7/2019 | Wang et al. | |
| 2019/0280761 | A1 | 9/2019 | Hu et al. | |
| 2019/0363779 | A1 | 11/2019 | Chae | |
| 2021/0021536 | A1* | 1/2021 | Ganesan | H04L 1/1874 |

FOREIGN PATENT DOCUMENTS

| CN | 106686724 | A | | 5/2017 |
| CN | 107889205 | A | | 4/2018 |
| CN | 108809897 | A | | 11/2018 |
| CN | 108886744 | A | | 11/2018 |
| CN | 110149711 | A | | 8/2019 |
| CN | 110290592 | A | | 9/2019 |
| EP | 2110999 | A1 | | 10/2009 |
| EP | 3432655 | A1 | | 1/2019 |
| KR | 10-2011-0078317 | A | | 7/2011 |
| WO | 2018016882 | A1 | | 1/2018 |
| WO | WO-2018024066 | A1 | * | 2/2018 |
| WO | 2018135913 | A1 | | 7/2019 |
| WO | 2019137221 | A1 | | 7/2019 |
| WO | 2019138912 | A1 | | 7/2019 |
| WO | 2019216607 | A1 | | 11/2019 |

OTHER PUBLICATIONS

Author Unknown, Bearer modelling and E2E QoS support for layer-2 relaying, Doc. No. R2-1703363, pp. 1-5, February (Year: 2017).*

Author Unknown, QoS considerations in FeD2D, Doc. No. R2-1701308, pp. 1-4, February (Year: 2017).*

Supplementary European Search Report dated Nov. 8, 2022, in connection with European Application No. 20887201.0, 7 pages.

International Search Report and Written Opinion of the International Searching Authority dated Feb. 18, 2021, in connection with International Application No. PCT/KR2020/016077, 8 pages.

Mediatek Inc., "On NR SL mode-1 resource allocation," R1-1904493, 3GPP TSG RAN1 WG1 Meeting #96bis, Xi'an, China, Apr. 8-12, 2019, 5 pages.

First Office Action dated Sep. 2, 2024, in connection with Chinese Application No. 202010859357.0, 14 pages.

Ericsson, "On Latency of mode-1 Sidelink Scheduling," TDoc R2-1815033, 3GPP TSG-RAN WG2 #103-Bis TDoc, Chengdu, China, Oct. 8-12, 2018, 4 pages.

Rejection Decision issued Feb. 11, 2025, in connection with Chinese Patent Application No. 202010859357.0, 10 pages.

Office Action issued Feb. 24, 2025, in connection with Chinese Patent Application No. 201911121754.1, 22 pages.

Samsung, "QoS parameter—Packet Delay Budget," S2-163704, SA WG2 Meeting #116, Vienna, Austria, Jul. 11-15, 2016, 9 pages.

Koziol et al., "QoS and Service Continuity in 3GPP D2D for IoT and Wearables," 2017 IEEE Conference on Standards for Communications and Networking (CSCN), 2017, 7 pages.

Communication pursuant to Article 94(3) EPC dated May 17, 2024, in connection with European Patent Application No. 20887201.0, 7 pages.

Office Action dated Aug. 19, 2025, in connection with Chinese Application No. 201911121754.1, 16 pages.

Office Action dated Dec. 15, 2025, in connection with Korean Application No. 10-2022-7016349, 20 pages.

Notification ofthe Decision to Grant a Patent Right for Patent for Invention dated Feb. 4, 2026, in connection with Chinese Application No. 2019111217541, 7 pages.

China Potevio Co., Ltd, "Relays with Different Scheduling Methods", 3GPP TSG RAN WG1 Meeting #56, R1-090670, Feb. 2009, 10 pages.

Liu, Q., et al., "A data dissemination algorithm based on composite relay in VANET", Journal of Chongqing University of Posts and Telecommunications (Natural Science Edition), vol. 29, No. 1, Feb. 2017, 7 pages.

* cited by examiner

1(a): Scenario of UE-to-UE relay

1(b): Scenario of UE-to-Network relay (source node is base station, remote node is sidelink UE)

Obtain, from second node, latency requirement of information to be forwarded and information to be forwarded — S101

Forward, to third node, information to be forwarded according to latency requirement of information to be forwarded — S102

Transmit information that is required to be
transmitted to third node, to first node ⟩~S201

Transmit latency requirement corresponding to
information that is required to be transmitted to third node, to first node ⟩~S202

FIG. 5

| PERFORMING A PREDETERMINED MEASUREMENT | ∽ S1101 |

| DETERMINING PARAMETERS FOR TRANSMITTING THE PUSCH ACCORDING TO A MEASUREMENT RESULT OF THE PREDETERMINED MEASUREMENT | ∽ S1102 |

| TRANSMITTING THE PUSCH BASED ON THE PARAMETERS FOR TRANSMITTING THE PUSCH | ∽ S1103 |

METHOD FOR INFORMATION TRANSMISSION AND DEVICE

CROSS-REFERENCE TO RELATED APPLICATIONS

This application is a 371 National Stage of International Application No. PCT/KR2020/016077, filed Nov. 16, 2020, which claims priority to Chinese Patent Application No. 201911121754.1, filed Nov. 15, 2019, Chinese Patent Application No. 201911155594.2, filed Nov. 22, 2019, Chinese Patent Application No. 202010852408.7, filed Aug. 21, 2020, and Chinese Patent Application No. 202010859357.0, filed Aug. 24, 2020, the disclosures of which are herein incorporated by reference in their entirety.

BACKGROUND

1. Field

The present application relates to the field of wireless communication technologies, and in particular, to a method for information transmission and device.

The present disclosure relates to the field of wireless communication technology, and more particularly, to a method and device for transmitting a Physical Uplink Shared Channel (PUSCH).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier(FBMC), non-orthogonal multiple access (NOMA), and sparse code multiple access (SCMA) as an advanced access technology have been developed.

In Long Term Evolution (LTE) technology, Sidelink (SL) communication mainly includes two mechanism, that is, direct communication of Device to Device (D2D) and vehicle-to-outside communication (Vehicle to Vehicle/Infrastructure/Pedestrian/Network (abbreviated as V2X). V2X is designed on the basis of D2D technology, which is superior to D2D in terms of data rate, latency, reliability, and link capacity, and is the most representative sidelink communication technology in LTE technology.

In LTE V2X system, sidelink communication also defines different physical channels, including Physical Sidelink Control Channel (PSCCH) and Physical Sidelink Shared Channel (PSSCH). The PSSCH is used to carry data, and the PSCCH is used to carry Sidelink Control Information (SCI). The SCI indicates the location of the time-frequency domain resource, modulation and coding scheme, and reception destination ID for the PSSCH in the associated PSSCH transmission. A sub-channel is also defined as the minimum unit of resource allocation in sidelink communication, and one sub-channel includes control channel resources, data channel resources, or both.

From the perspective of resource allocation, the LTE V2X system includes two modes, that is, a resource allocation mode based on base station scheduling (Mode 3) and a resource allocation mode autonomously selected by a user equipment (UE) (Mode 4). Both modes are based on the sub-channels defined in the sidelink system. The base station schedules or UE autonomously selects several control and/or data sub-channels for sidelink transmission.

The 5G NR (Fifth-Generation New Radio) system, as an evolution technology of LTE, also includes the further evolution of sidelink communication, and the concepts of PSCCH and PSSCH are similarly introduced in NR V2X and also supports resource allocation mode based on base station scheduling (Mode 1) and resource allocation mode autonomously selected by the UE (Mode 2).

Further, unlike the LTE sidelink communication system which does not support Hybrid Automatic Repeat request-ACK (HARQ-ACK) feedback, the NR V2X also introduces the HARQ-ACK feedback mechanism, which is applicable to unicast and multicast services. After a transmitting UE transmits data and the corresponding SCI, a receiving UE will transmit the corresponding ACK/NACK feedback information to the transmitting UE, which is used to enable the transmitting UE to determine whether data retransmission is required. In NR V2X, the channel used to carry ACK/NACK feedback information is a Physical Sidelink Feedback Channel (PSFCH). In Mode 1, if the sidelink transmission is based on HARQ, the transmitting UE will also report the HARQ-ACK of the sidelink to a base station, so that the base station determines whether the transmitting UE needs to schedule a sidelink resource for retransmission accordingly.

The relay-based communication technology was introduced into the LTE D2D system in release 13. The LTE D2D relay technology supports one hop at most, which refers to a communication link of source node-relay node-destination node (also known as a remote node), the maximum number of the relay nodes supported is 1. The LTE D2D relay technology uses a layer 3 based relay method. In this relay method, in the process that the relay node obtains the data of the source node, the relay node does not distinguish whether the data is transmitted to the relay node or the remote node in layer 1 (physical layer) and layer 2 (Medium Access Control, MAC) layer, Radio Link Control (RLC) layer and Packet Data Convergence Protocol (PDCP) layer, but decodes and delivers the data to Radio Resource Control (RRC) layer, determines the destination node for the data by the processing in an higher layer (such as RRC layer, Application Server (AS) layer, V2X layer or application layer), and generates the data to be transmitted to the relay node. Similarly, during the process that the relay node transmits the data of the source node to the remote node, neither layer 1 nor layer 2 distinguishes whether the data comes from the source node or from the relay node, instead, the higher layer from the remote node distinguishes and processes the data. Therefore, for sidelink transmission with or without relay enabled, the behavior of UEs below layer 3 in LTE D2D is basically the same, that is, the relay transmission in LTE D2D is transparent to layer 1 and layer 2.

For the CG PUSCH, how to determine transmission parameters (an appropriate transmission power, an appropriate modulation and coding scheme, etc.) for the CG PUSCH are issues that need to be studied.

SUMMARY

The layer-3-based relay forwarding is used in the LTE D2D system, and while handing over the relay path at the remote node (for example, handing over from relay transmission to direct transmission with the base station, or handing over a relay node) and performing handover, service continuity cannot be guaranteed. Since the relayed information needs to be processed in a higher layer, and may require interaction of the application layer and other layers with the RRC layer, resulting a corresponding significant latency increase, which cannot meet some typical application scenarios of the sidelink system, for example, some services with high requirement for latency in NR V2X scenarios.

In view of the shortcomings of the existing methods, the present application proposes a method for information transmission and device to solve the problem of how to meet the needs of services with high requirement for latency.

In the first aspect, a method for information transmission is provided, which is applied to a first node and includes:
obtaining, from a second node, a latency requirement of information to be forwarded and the information to be forwarded; and
forwarding, to a third node, the information to be forwarded according to the latency requirement of information to be forwarded.

Optionally, the obtaining a latency requirement of information to be forwarded includes:
obtaining the latency requirement from the second node, when determining that the information is required to be forwarded to the third node.

Optionally, the manner for obtaining the latency requirement from the second node includes at least one of the following:
obtaining the latency requirement indicated in a physical layer signaling by the second node;
obtaining the latency requirement indicated in a media access control (MAC) signaling or another layer 2 signaling by the second node; and
obtaining the latency requirement indicated in radio resource control (RRC) signaling or another higher layer signaling by the second node.

Optionally, the physical layer signaling includes sidelink control information (SCI), and when the physical layer signaling is the SCI, the latency requirement indicated in the physical layer signaling is the latency requirement of sidelink data associated with the SCI; and
the MAC signaling includes at least one of an MAC control element CE (MAC CE), an MAC header, and an MAC sub-header.

Optionally, the latency requirement is directly or indirectly indicated by at least one of the following:
a time at which the information is generated at the second node, basic latency requirement of the information, a time offset between time at which the second node transmits the information to the first node and time at which the information is generated at the second node, a specific time length within which the first node is required to transmit the information to the third node.

Optionally, the latency requirement includes an indirect indicated latency requirement, and the manner for determining the indirect indicated latency requirement includes:
obtaining transmission latency indicated by the second node, and determining the basic latency requirement of the information from an higher layer of the second node and/or the first node, the transmission latency including a time offset between the time at which the second node transmits the information to the first node and the time at which the information is generated at the second node; and
determining a latency requirement of the information according to the basic latency requirement and the transmission latency.

Optionally, when the information is transmitted by the second node for multiple times, the latency requirement includes at least one of the following:
latency requirement determined based on the initial transmission of the information by the second node;
latency requirement determined based on the last transmission of the information by the second node;
latency requirement determined, when the latency requirement is indicated in one transmission in which the second node transmits the information, based on the one transmission.

Optionally, the manner for determining the latency requirement is based on a transmission manner for transmitting the information by the second node, and the transmission manner includes at least one of Hybrid Automatic Repeat request (HARQ)-based transmission and blind retransmission.

Optionally, the manner of forwarding, to the third node, the information to be forwarded according to the latency requirement of the information to be forwarded includes at least one of the following:
forwarding, to the third node, the information to be forwarded, wherein the time of the forwarded initial transmission does not exceed the latency requirement;
forwarding, to the third node, the information to be forwarded, wherein the time of at least forwarded first N transmissions and/or retransmissions does not exceed the latency requirement, and N is a positive integer; and
forwarding, to the third node, the information to be forwarded, wherein the time of the forwarded total transmission and/or retransmission does not exceed the latency requirement.

Optionally, the forwarding the information to be forwarded to a third node according to the latency requirement of the information to be forwarded includes:
forwarding the information to the third node without decoding after receiving the information, in the case that the latency requirement meets a given first interval; and/or
forwarding the information to the third node after the received information is decoded successfully, in the case that the latency requirement meets a given second interval.

Optionally, the method further includes: when transmitting, to the third node, the information to be forwarded, determining or adjusting a parameter for selecting a sidelink resource according to the latency requirement.

Optionally, the parameters include at least one of a time window for channel sensing, an energy threshold used for determining whether to exclude resources during channel sensing, an available time range for resources used for transmission; and time range for resource reservation, and the time window for channel sensing includes at least one of a start time point, an end time point, and a time window length of the time window.

In a second aspect, a method for information transmission is provided, which is applied to a second node and includes:

transmitting information that is required to be transmitted to a third node, to a first node; and transmitting a latency requirement corresponding to the information that is required to be transmitted to the third node, to the first node.

Optionally, the manner for transmitting the latency requirement corresponding to the information that is required to be transmitted to the third node, to the first node includes at least one of the following:

indicating the latency requirement in physical layer signaling;

indicating the latency requirement in media access control (MAC) signaling or another layer 2 signaling; and indicating the latency requirement in radio resource control (RRC) signaling or another higher layer signaling.

Optionally, the physical layer signaling includes sidelink control information (SCI); and when the physical layer signaling is the SCI, the latency requirement indicated in the physical layer signaling is the latency requirement of sidelink data associated with the SCI; the MAC signaling includes at least one of an MAC control element CE (MAC CE), an MAC header, and an MAC sub-header.

Optionally, when the information is transmitted by the second node for multiple times, the latency requirement includes at least one of the following:

latency requirement determined based on the initial transmission of the information by the second node;

latency requirement determined based on the last transmission of the information by the second node; and latency requirement determined, when the latency requirement is indicated in one transmission in which the second node transmits the information, based on the one transmission.

In a third aspect, a first node device is provided, including:

a first processing module, configured to obtain, from the second node, a latency requirement of information to be forwarded and the information to be forwarded; and a second processing module, configured to forward, to the third node, the information to be forwarded according to the latency requirement of the information to be forwarded.

According to a fourth aspect, a second node device is provided, including:

a third processing module, configured to transmit information that is required to be transmitted to a third node, to a first node; and a fourth processing module, configured to transmit a latency requirement corresponding to the information that is required to be transmitted to the third node, to the first node.

In a fifth aspect, the present application provides a first node device, including: a processor, a memory, and a bus; wherein the bus is configured to connect the processor and memory;

the memory is configured to store operating instructions; and the processor is configured to execute the method for information transmission of the first aspect of the present application by calling operation instructions.

In a sixth aspect, the present application provides a second node device, including: a processor, a memory, and a bus; wherein the bus is configured to connect the processor and memory;

the memory is configured to store operating instructions;

the processor is configured to execute the method for information transmission of the second aspect of the present application by calling operation instructions.

According to an exemplary embodiment of the present disclosure, there is provided a method for transmitting a PUSCH, comprising performing a predetermined measurement, determining parameters for transmitting the PUSCH according to a measurement result of the predetermined measurement, and transmitting the PUSCH based on the parameters for transmitting the PUSCH.

Alternatively, the predetermined measurement may comprise at least one of an interference measurement, an energy measurement, and a LBT measurement.

Alternatively, the determining of the parameters for transmitting the PUSCH according to the measurement result of the predetermined measurement may comprise determining the parameters for transmitting the PUSCH by determining power control parameters and/or Modulation and Coding Strategy (MC S) according to the measurement result of the predetermined measurement.

Alternatively, the determining of the parameters for transmitting the PUSCH by determining the power control parameters may comprise determining the power control parameters according to the measurement result of the predetermined measurement, and determining the parameters for transmitting the PUSCH according to the determined power control parameters.

Alternatively, the determining of the parameters for transmitting the PUSCH by determining the MCS may comprise determining the MCS according to the measurement result of the predetermined measurement, and determining the PUSCH code rate according to the determined MCS.

Alternatively, the determining of the power control parameters according to the measurement result of the predetermined measurement may comprise comparing the measurement result of the predetermined measurement with a predetermined threshold, and determining the power control parameters according to the comparison result.

Alternatively, the determining of the MCS based on the measurement result of the predetermined measurement may comprise comparing the measurement result of the predetermined measurement with a predetermined threshold, and determining the MCS according to the comparison result.

Alternatively, the determining of the power control parameters according to the comparison result may comprise determining the power control parameters according to a threshold range where the measurement result of the predetermined measurement is located.

Alternatively, the determining of the MCS according to the comparison result may comprise determining the MCS according to a threshold range where the measurement result of the predetermined measurement is located.

Alternatively, the method for transmitting the PUSCH may further comprise determining MCS indication information according to the determined MCS, and transmitting the determined MCS indication information to the base station, wherein the MSC indication information is used for indicating the determined MCS.

Alternatively, the transmitting of the MCS indication information to the base station may comprise selecting time-frequency resources for transmitting the MCS indication information from time-frequency resources of the PUSCH, and transmitting the MCS indication information to the base station through the selected time-frequency resources.

Alternatively, the selecting of the time-frequency resources for transmitting the MCS indication information from the time-frequency resources of the PUSCH may comprise determining the number of the time-frequency resources for transmitting the MCS indication information, determining the starting points of the time-frequency resources for transmitting the MCS indication information, and determining the time-frequency resources for transmitting the MCS indication information according to the determined number of the time-frequency resources and the determined starting points of the time-frequency resources.

Alternatively, the determining of the number of the time-frequency resources for transmitting the MCS indication information may comprise acquiring candidate numbers of time-frequency resources for transmitting the MCS indication information, and selecting the number of the time-frequency resources for transmitting the MCS indication information from the candidate numbers of the time-frequency resources for transmitting the MCS indication information according to the measurement result of the predetermined measurement.

Alternatively, the determining of the starting points of the time-frequency resources for transmitting the MCS indication information may comprise determining the time domain starting point for transmitting the MCS indication information according to a position of a Demodulation Reference Signal (DMRS), and determining the frequency domain starting point for transmitting the MCS indication information according to the frequency domain starting point of the PUSCH.

According to an exemplary embodiment of the present disclosure, there is provided a device for transmitting a PUSCH, comprising a measurement execution unit configured to perform a predetermined measurement, a parameter determining unit configured to determine parameters for transmitting the PUSCH according to a measurement result of the predetermined measurement, and a PUSCH transmitting unit configured to transmit the PUSCH based on the parameters for transmitting the PUSCH.

Alternatively, the predetermined measurement may comprise at least one of an interference measurement, an energy measurement, and a LBT measurement.

Alternatively, the parameter determining unit may be configured to determine the parameters for transmitting the PUSCH by determining the power control parameters and/or the Modulation and Coding Strategy (MCS) according to the measurement result of the predetermined measurement.

Alternatively, the parameter determining unit may be further configured to determine the power control parameters according to the measurement result of the predetermined measurement, and to determine the parameters for transmitting the PUSCH according to the determined power control parameters.

Alternatively, the parameter determining unit may be further configured to determine the MCS according to the measurement result of the predetermined measurement, and to determine the PUSCH code rate according to the determined MCS.

Alternatively, the parameter determining unit may be further configured to compare the measurement result of the predetermined measurement with a predetermined threshold, and to determine the power control parameters according to the comparison result.

Alternatively, the parameter determining unit may be further configured to compare the measurement result of the predetermined measurement with a predetermined threshold, and to determine the MCS according to the comparison result.

Alternatively, the parameter determining unit may be further configured to determine the power control parameters according to a threshold range where the measurement result of the predetermined measurement is located.

Alternatively, the parameter determining unit may be further configured to determine the MCS according to a threshold range where the measurement result of the predetermined measurement is located.

Alternatively, the device for transmitting the PUSCH may further comprise an indication information determining unit configured to determine MCS indication information according to the determined MCS, and an indication information transmitting unit configured to transmit the determined MCS indication information to the base station, wherein the MSC indication information is used for indicating the determined MCS.

Alternatively, the indication information transmitting unit may be further configured to select time-frequency resources for transmitting the MCS indication information from time-frequency resources of the PUSCH, and to transmit the MCS indication information to the base station through the selected time-frequency resources.

Alternatively, the indication information transmitting unit may be further configured to determine the number of the time-frequency resources for transmitting the MCS indication information, to determine the starting points of the time-frequency resources for transmitting the MCS indication information, and to determine the time-frequency resources for transmitting the MCS indication information according to the determined number of the time-frequency resources and the determined starting points of the time-frequency resources.

Alternatively, the indication information transmitting unit may be further configured to acquire candidate numbers of time-frequency resources for transmitting the MCS indication information, and to select the number of the time-frequency resources for transmitting the MCS indication information from the candidate numbers of the time-frequency resources for transmitting the MCS indication information according to the measurement result of the predetermined measurement.

Alternatively, the indication information transmitting unit may be further configured to determine the time domain starting point for transmitting the MCS indication information according to a position of a Demodulation Reference Signal (DMRS), and to determine the frequency domain starting point for transmitting the MCS indication information according to the frequency domain starting point of the PUSCH.

According to an exemplary embodiment of the present disclosure, there is provided a computer readable storage medium stored with a computer program, when the computer program is executed by a processor, the method for transmitting the PUSCH according to the present disclosure is implemented.

According to an exemplary embodiment of the present disclosure, there is provided a user equipment including a processor, and a memory stored with a computer program. When the computer program is executed by a processor, the method for transmitting the PUSCH according to the present disclosure is implemented.

The method and device for transmitting the PUSCH according to the present disclosure, by performing a predetermined measurement, determining parameters for transmitting the PUSCH according to a measurement result of the predetermined measurement, and transmitting the PUSCH based on the parameters for transmitting the PUSCH, thus adjustment of the PUSCH transmission parameters and improved performance of the PUSCH can be achieved.

Additional aspects and/or advantages of the present general inventive concept will be set forth in part in the description which follows, still a portion will be apparent from the description or may be learned by the implementation of the general concept of the present disclosure.

The technical solution provided by embodiments of the present application has at least the following beneficial effects:

By obtaining, from the second node, the latency requirement of information to be forwarded and the information to be forwarded and forwarding, to the third node, the information to be forwarded according to the latency requirement of the information to be forwarded, thus the first node forwards the information to be forwarded to the third nod according to the latency requirement of the information to be forwarded, which satisfies the requirements of services with high latency requirements.

Additional aspects and advantages of the present application will be partially given in the following description, which will become apparent from the following description, or be learned through the practice of the present application.

BRIEF DESCRIPTION OF THE DRAWINGS

In order to more clearly explain the technical solutions in the embodiments of the present application, the drawings needed to be used in the description of the embodiments of the present application will be briefly introduced below.

FIG. 5 is a schematic diagram of the timing of relay forwarding when the latency requirement is higher than a specific threshold according to an embodiment of the present application;

10

Figure 11:
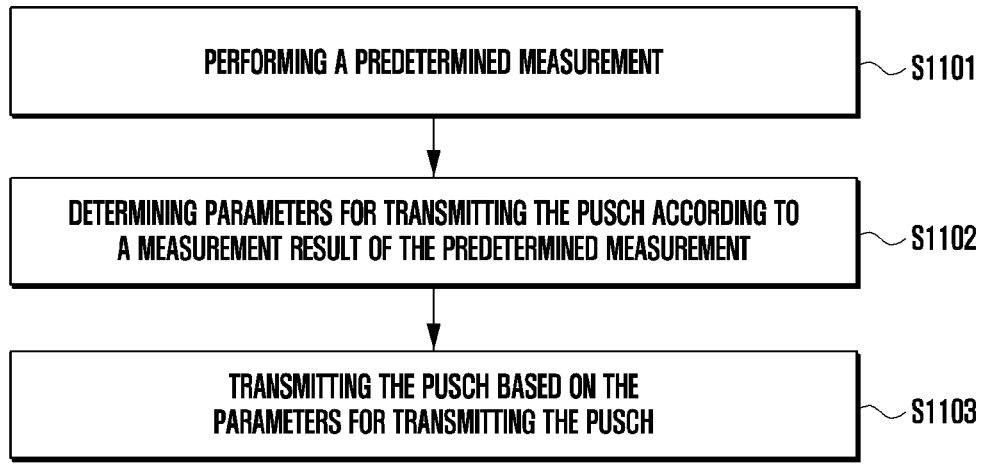
Figure 12:
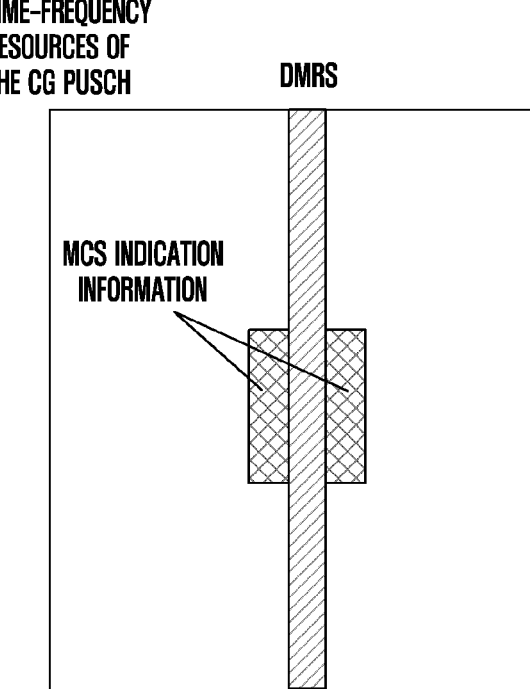
Figure 13:
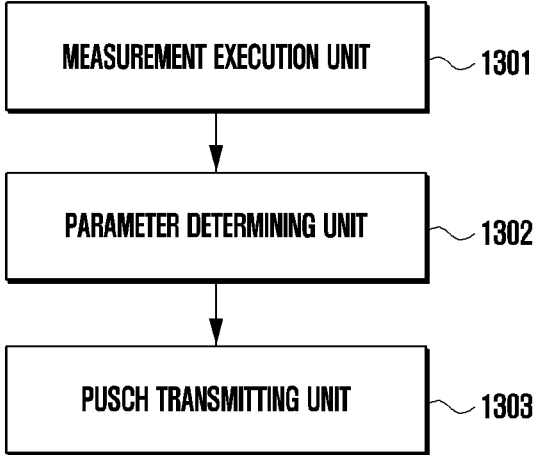
Figure 14:
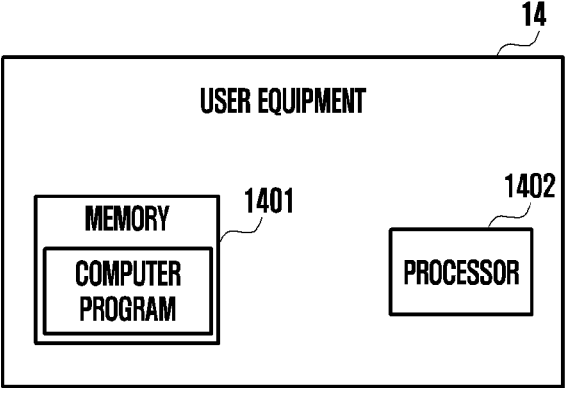

The above and other objects and features of the exemplary embodiments of the present disclosure will become more apparent from the following description taken in conjunction with the accompanying drawings that exemplarily illustrates embodiments, in which:

FIG. 11 illustrates a flowchart of a method for transmitting a PUSCH according to an exemplary embodiment of the present disclosure;

FIG. 12 illustrates a schematic diagram of an example position of a time-frequency resource for transmitting MCS indication information according to an exemplary embodiment of the present disclosure;

FIG. 13 illustrates a block diagram of a device for transmitting a PUSCH according to an exemplary embodiment of the present disclosure; and FIG. 14 illustrates a schematic diagram of a user equipment according to an exemplary embodiment of the present disclosure.

DETAILED DESCRIPTION

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to better understand and explain the solutions of the embodiments of the present application, the following briefly describes some technologies involved in the embodiments of the present application.

A slot in the following embodiments may be either a subframe or a slot in a physical sense, or a subframes or a slot in a logical sense. Specifically, the subframe or slot in a logical sense is the subframe or slot corresponding to a resource pool for sidelink communication. For example, in a V2X system, a resource pool is defined by a repeated bitmap, which is mapped to a specific set of slots. The specific set of slots can be all slots, or all uplink slots, or all other slots except some specific slots (such as the slots for transmitting MIB/SIB). The slot indicated as "1" in the bitmap can be used for V2X transmission and belongs to the slot corresponding to the V2X resource pool; the slot indicated as "0" cannot be used for V2X transmission and does not belong to the slot corresponding to the V2X resource pool. In addition, the subframes or slots in the physical sense can also be replaced with uplink or downlink subframes or slots; further, they can be replaced with cell-specific uplink or downlink subframes or slots.

The following describes the difference between the physical or logical subframes/slots in a typical application scenario: when calculating the gap in time domain between two specific channels/messages (for example, PSSCH carrying sidelink data and PSFCH carrying corresponding feedback information), assuming that the gap is N slots, if the subframe or slot in the physical sense is calculated, the N slots correspond to the absolute time length of N*x milliseconds in time domain, wherein x is the time length of physical slots (subframes) in the parameter set (numerology) of this scenario; otherwise, if the subframe or slot in the logical sense is calculated, taken the sidelink resource pool defined by the bitmap as an example, the gap of the N slots corresponds to the N slots indicated as "1" in the bitmap, and the absolute time length of the gap changes according to the specific configuration of the sidelink communication resource pool, rather than a fixed value.

Further, a slot in the following embodiment may be a complete slot, or may be several symbols corresponding to the sidelink communication in one slot, for example, when the sidelink communication is configured to perform on the X1th—X2th symbols of each slot, the slot in the following embodiment is the X1th~X2th symbols in the slot in this scenario; or, when the sidelink communication is configured as a mini-slot transmission, a slot in the following embodiments is a mini slots defined or configured in the sidelink system, rather than a slot in the NR system.

Further, the length of the slot in the following embodiments may be determined according to at least one of the physical length of the uplink slot, the physical length of the downlink slot, and the physical length of the sidelink slot, since an uplink/downlink numerology and a sidelink numerology may be different in certain deployment scenarios. Further, the length of the slot in the following embodiment is determined according to the physical length of the corresponding type of slot. For example, when the slot in the following embodiment is a sidelink slot, the physical length of the sidelink slot is used to determine the length of the slot.

In the following embodiments, information configured by the base station, indicated by signaling, configured by higher layer, and pre-configured includes a set of configuration information; it also includes multiple sets of configuration information, and the UE selects a set of configuration information for use according to predefined conditions; it also includes a set of configuration information, wherein the set of configuration information contains multiple subsets, and the UE selects one subset to use according to predefined conditions.

Part of the technical solutions provided in the following embodiments are specifically described based on the V2X system, but its application scenario should not be limited to the V2X system in sidelink communication, but can also be applied to other sidelink transmission systems. For example, the design based on V2X sub-channels in the following embodiments may also be used for D2D sub-channels or other sidelink transmission sub-channels. The V2X resource pool in the following embodiments may also be replaced with a D2D resource pool in other sidelink transmission systems such as D2D.

In the following embodiments, when the sidelink communication system is a V2X system, the terminal or UE may be various types of terminals or UEs such as Vehicle, Infrastructure, Pedestrian and the like.

In the NR sidelink system, there are mainly two types of relay scenarios: UE-to-UE relay and UE-to-network relay.

Figure 1:
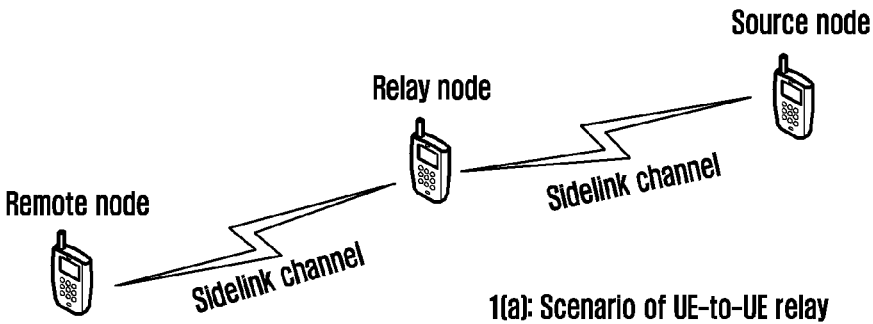
FIG. 1 is a schematic diagram of a one-hop relay in an NR sidelink system.
Figure 1:
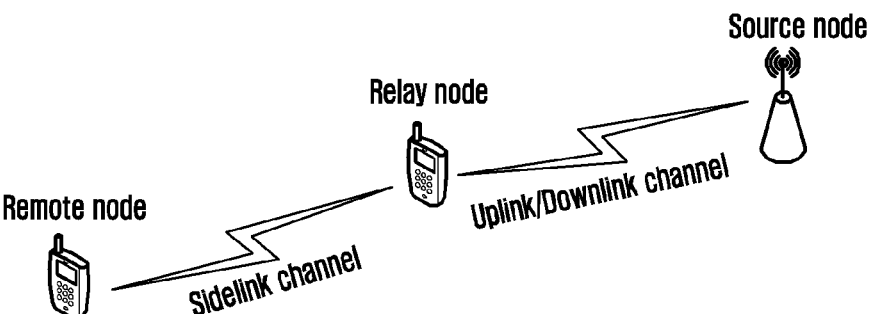

In the scenario of relay transmission, a node that generates data is referred to as a source node, and a node that receives data is referred to as a remote node or a destination node. In this communication link, a node that forwards the data generated by the source node to the remote node is referred to as a relay node. In the scenario of UE-to-UE relay, both the source node and the remote node are sidelink UEs. In the scenario of UE-to-network relay, the source node is a base station, and the remote node is a sidelink UE; or the source node is a sidelink UE and the remote node is a base station. FIGS. 1(a) and 1(b) in FIG. 1 respectively schematically show one-hop relays in two types of scenarios. There is only one relay node in the relay link of one-hop relay.

In the following embodiments, the one-hop relay is used as an example to describe the technical method in detail, but the method can also be similarly used in a multi-hop relay scenario. In the multi-hop relay system, the information from the source node in the present application can be from the previous hop relay node in the multi-hop relay system; similarly, the information transmitted to the remote node in the present application can be transmitted to a next hop relay node in the multi-hop relay system. Other interactions with the source node or the remote node can be similarly replaced with interactions with a previous hop or a next hop relay node. In the following embodiments, this description will not be repeated.

In the NR sidelink communication system, there is a sidelink service which is sensitive to latency. One of the specific manifestations of this type of service is that the service packet must be transmitted within a time window after reaching the higher layer. Otherwise, after the cast packet transmission exceeds this time window, the timeliness cannot be met, it will be directly regarded as a transmission failure. The specific length of the time window is a direct reflection of the latency requirement of the service. In the prior art, in general, for specific sidelink data, such as a given packet or sidelink transport block (TB), the latency requirement corresponding to the sidelink service carried by the data is obtained from the application layer. When transmitting the sidelink data, the transmitting UE of the sidelink data, as a generator of the sidelink packet or TB, also needs to obtain the latency requirement from the application layer, and transmits the sidelink data to the transmitting UE as far as possible under the premise of meeting the latency requirement. In the prior art, a typical parameter used to characterize the latency requirement is packet delay budget (PDB). For example, in the prior art, the PDB of the latency-sensitive sidelink service is typically 3 ms, and then the transmitting UE of the sidelink data needs to transmit the packet to the destination node or transmits the entire TB or at least one TB generated based on the packet to the destination node.

In the relay-based communication system, due to this service attribute, the relay UE may also need to obtain the latency requirements of the sidelink data to be forwarded from the source UE, and try to forward sidelink data to the transmitting UE as much as possible under the premise of meeting the latency requirement. However, what may be different from the definition in the prior art is how to understand the latency requirement. In the prior art, the latency requirement is determined by the cast type and is an inherent attribute of the sidelink packet or TB. In the relay-based communication system, at the source node, the latency requirement can also be determined by using the same method as in the prior art, that is determined by the cast type; but at the relay node, since it spend certain time for the relay node to receive the sidelink packet or TB transmitted by the source node, and the time available at the relay node for transmitting the sidelink packet or TB will be shortened accordingly; therefore, when the relay node forwards the data of the source node, its latency requirement is no longer the inherent attribute of the sidelink packet or TB, but may be determined based on the cast type and the specific status of the source node's sidelink transmission.

To make the objectives, technical solutions, and advantages of the present application clearer, the following describes the embodiments of the present application in further detail with reference to the accompanying drawings.

Embodiment 1

Figure 2:
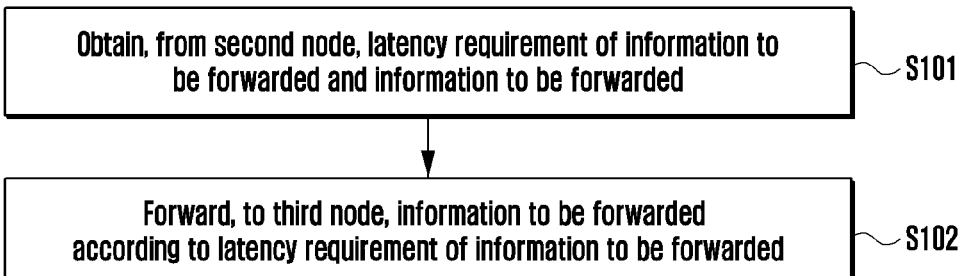
FIG. 2 is a schematic flowchart of a method for information transmission according to an embodiment of the present application.

An embodiment of the present application provides a method for information transmission, which is applied to a first node. A schematic flowchart of the method is shown in FIG. 2. The method includes:

Step S101: obtaining, from a second node, a latency requirement of information to be forwarded and the information to be forwarded.

Step S102: forwarding, to a third node, the information to be forwarded according to the latency requirement of information to be forwarded.

Optionally, the first node is a relay node, and the relay node is a user equipment (UE) or base station; the second node is a source node, and the source node is a UE or base station; and the third node is a remote node, and the remote node is a UE or base station.

In the embodiment of the present application, by obtaining, from the second node, the latency requirement of information to be forwarded and the information to be forwarded and forwarding, to the third node, the information to be forwarded according to the latency requirement of the information to be forwarded, the first node forwards the information to be forwarded to the third nod according to the latency requirement of the information to be forwarded, which satisfies the requirements of services with higher latency requirements.

Optionally, the obtaining a latency requirement of information to be forwarded includes:

obtaining the latency requirement from the second node, when determining that the information is required to be forwarded to the third node.

Optionally, the manner for obtaining the latency requirement from the second node includes at least one of the following:

obtaining the latency requirement indicated in a physical layer signaling by the second node;

obtaining the latency requirement indicated in a media access control (MAC) signaling or another layer 2 signaling by the second node; and obtaining the latency requirement indicated in a radio resource control (RRC) signaling or another higher layer signaling by the second node.

Optionally, the physical layer signaling includes sidelink control information SCI, and when the physical layer signaling is the SCI, the latency requirement indicated in the physical layer signaling is the latency requirement of sidelink data associated with the SCI; and the MAC signaling includes at least one of an MAC control element CE (MAC CE), an MAC header, and an MAC sub-header.

Optionally, the latency requirement is directly or indirectly indicated by at least one of the following:

a time at which the information is generated at the second node, basic latency requirement of the information, a time offset between time at which the second node transmits the information to the first node and time at which the information is generated at the second node, a specific time length within which the first node is required to transmit the information to the third node.

Optionally, the latency requirement includes an indirect indicated latency requirement, and the manner for determining the indirect indicated latency requirement includes:

obtaining transmission latency indicated by the second node, and determining the basic latency requirement of the information from an higher layer of the second node and/or the first node, the transmission latency including a time offset between the time at which the second node transmits the information to the first node and the time at which the information is generated at the second node; and determining a latency requirement of the information according to the basic latency requirement and the transmission latency.

Optionally, when the information is transmitted by the second node for multiple times, the latency requirement includes at least one of the following:

latency requirement determined based on the initial transmission of the information by the second node;

latency requirement determined based on the last transmission of the information by the second node;

latency requirement determined, when the latency requirement is indicated in one transmission in which the second node transmits the information, based on the one transmission.

Optionally, the manner for determining the latency requirement is based on a transmission manner for transmitting the information by the second node, and the transmission manner includes at least one of Hybrid Automatic Repeat request (HARQ)-based transmission and blind retransmission.

Optionally, the manner of forwarding, to the third node, the information to be forwarded according to the latency requirement of the information to be forwarded includes at least one of the following:

forwarding, to the third node, the information to be forwarded, wherein the time of the forwarded initial transmission does not exceed the latency requirement;

forwarding, to the third node, the information to be forwarded, wherein the time of at least forwarded first N transmissions and/or retransmissions does not exceed the latency requirement, and N is a positive integer; and forwarding, to the third node, the information to be forwarded, wherein the time of the forwarded total transmission and/or retransmission does not exceed the latency requirement.

Optionally, the forwarding the information to be forwarded to a third node according to the latency requirement of the information to be forwarded includes:

forwarding the information to the third node without decoding after receiving the information, in the case that the latency requirement meets a given first interval; and/or forwarding the information to the third node after the received information is decoded successfully, in the case that the latency requirement meets a given second interval.

Optionally, the method further includes when transmitting, to the third node, the information to be forwarded, determining or adjusting a parameter for selecting a sidelink resource according to the latency requirement.

Optionally, the parameters include at least one of a time window for channel sensing, an energy threshold used for determining whether to exclude resources during channel sensing, an available time range for resources used for transmission; and time range for resource reservation, and the time window for channel sensing includes at least one of a start time point, an end time point, and a time window length of the time window.

The technical solution provided by the embodiments of the present application has at least the following beneficial effects:

the first node forwards, to the third node, the information to be forwarded according to the latency requirement of the information to be forwarded, which satisfies the requirements of services with higher latency requirements.

Figure 3:
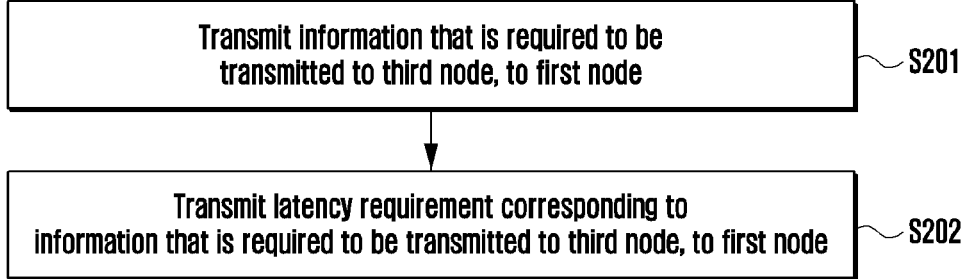
FIG. 3 is a schematic flowchart of another method for information transmission according to an embodiment of the present application.

An embodiment of the present application provides another method for information transmission, which is applied to a second node. A schematic flowchart of the method is shown in FIG. 3. The method includes:

Step S201: transmitting information that is required to be transmitted to a third node, to a first node.

Step S202: transmitting a latency requirement corresponding to the information that is required to be transmitted to the third node, to the first node.

Optionally, the manner for transmitting the latency requirement corresponding to the information that is required to be transmitted to the third node, to the first node, includes at least one of the following:

indicating the latency requirement in physical layer signaling;

indicating the latency requirement in media access control (MAC) signaling or another layer 2 signaling; and indicating the latency requirement in radio resource control (RRC) signaling or another higher layer signaling.

Optionally, the physical layer signaling includes sidelink control information (SCI), and when the physical layer signaling is the SCI, the latency requirement indicated in the physical layer signaling is the latency requirement of sidelink data associated with the SCI; the MAC signaling includes at least one of an MAC control element CE (MAC CE), an MAC header, and an MAC sub-header.

Optionally, when the information is transmitted by the second node for multiple times, the latency requirement includes at least one of the following:

latency requirement determined based on the initial transmission of the information by the second node;

latency requirement determined based on the last transmission of the information by the second node; and latency requirement determined, when the latency requirement is indicated in one transmission in which the second node transmits the information, based on the one transmission. The technical solution provided by the embodiments of the present application has at least the following beneficial effects:

It meets the needs of services with high latency requirements.

The above embodiments of the present application are fully and thoroughly introduced through the following embodiments:

In a relay-based communication system, it is necessary to additionally introduce a method for the relay node to obtain the latency requirement of the sidelink data received from the source node, and it is necessary to additionally introduce a method for the relay node to determine how to relay the sidelink data according to the latency requirement of the sidelink data received from the source node, as follow:

The relay node obtains the latency requirement of the information to be forwarded and the information to be forwarded from the source node; and the relay node forwards the information to be forwarded to the remote node according to the latency requirement.

Wherein, the relay node obtains the latency requirement of the information to be forwarded from the source node, including: the source node obtains the latency requirements of the information to be forwarded from the source node when the relay node receives the information to be forwarded, and determines that the information needs to be forwarded to the remote node.

Optionally, the relay node obtaining the latency requirement of the information to be forwarded from the source node, includes at least one of the following:

obtaining the latency requirement indicated by the source node in the physical layer signaling; further, the physical layer signaling includes sidelink control information SCI; if the physical layer signaling is SCI, the latency requirement indicated in the physical layer signaling is the latency requirement of sidelink data associated with SCI; wherein, if the system supports 2-stage SCI (an existing technology that divides an SCI into a first stage SCI and a second stage SCI), the SCI further includes the first stage SCI and the second stage SCI;

Obtaining the latency requirement indicated by the source node in MAC signaling or another layer 2 signaling; further, the MAC signaling includes at least one of MAC CE, MAC header, and MAC sub-header;

Obtaining the latency requirement indicated by the source node in RRC signaling or another higher layer signaling.

Wherein, the physical meaning of the latency requirement of the information to be forwarded is that the relay node needs to transmit the information to be forwarded to the remote node within the time range corresponding to the latency requirement.

Wherein, the latency requirements indicated by the source node in various signaling include directly indicated latency requirements and indirect indicated latency requirements.

Wherein, the basic latency requirement of the information to be forwarded may be determined according to the cast type or the cast attribute. The basic latency requirement is used to indicate the total latency requirement for the service to be transmitted to the remote node, which is an inherent attribute of the information and is independent of the time consumed by the source node in transmitting the information that needs to be forwarded to the relay node (this time can be reflected by the transmission latency indicated by the source node). A specific example is that the information to be forwarded is generated in slot n (the generated specific definition may refer to reaching the higher layer of the source node, the same is true below, and the description will not be repeated), and the information needs to be transmitted to the remote node before slot n+k, otherwise the information is considered to exceed the latency requirement and cause the transmission failure; then k is the basic latency requirement of the information.

Wherein, the latency requirement indicated by the source node can be used to determine how long a time window the relay node should forward it to the remote node after receiving the information to be forwarded. The latency requirement indicated by the source node obtained by the relay node may be directly or indirectly indicated by at least one of the following:

the time point when the information to be forwarded is generated at the source node;

the basic latency requirement of the information to be forwarded;

the time offset between the time point when the source node transmits the information to be forwarded to the relay node and the time point when the information to be forwarded is generated at the source node; and a specific time length within which the first node is required to transmit the information to the third node.

Wherein, the time domain measurement unit of the above time point or time length may be a slot, or a physical time length, such as milliseconds.

Wherein, if the source node transmits the information to be forwarded after multiple transmissions (retransmissions), the latency requirement indicated by the source node is based on at least one of the above, and further includes:

the latency requirement is determined based on the initial transmission of the information by the second node;

the latency requirement is determined based on the last transmission of the information by the second node;

when the latency requirement is indicated in one transmission in which the second node transmits the information, the latency requirement is determined based on the one transmission (that is, the value of the latency requirement indicated in multiple transmissions can be different).

Optionally, the initial transmission of the information to be forwarded by the source node refers to the initial transmission of the sidelink transmission block (TB) that carries the information to be forwarded; similarly, the source node transmits other one or more transmission of information to be forwarded refers to other one or more retransmissions of the sidelink transmission block (TB) carrying the information to be forwarded, and the last transmission that the source node transmits the information to be forwarded refers to the last transmission or retransmission of the sidelink transmission block (TB) carrying the information to be forwarded.

Optionally, which transmission is used to determine the latency requirement indicated by the source node to the relay node is indicated by the source node when indicating the latency requirement, and the indication may be direct or indirect.

Optionally, the indirect indication in the indication method for which transmission is used to determine the latency requirement indicated by the source node to the relay node (for description, the latency requirement is hereinafter assumed to be K) may be determined based on the specific transmission manner. For example, if the source node uses blind retransmission to transmit the information to the relay node, the source node can reserve the resource and determine the time of the last transmission of the blind retransmission before starting the transmission. The source node can simply determine the value of K according to the last transmission of the information to be forwarded. For example, if the source node uses HARQ-based transmission to transmit the information to the relay node, because the source node cannot predict after which transmission the information can be successfully decoded by the receiving node, the source node is more suitable for the current one transmission dynamics determine the value of K. For example, if the source node uses HARQ-based transmission or blind retransmission to transmit this information to the relay node, and indicates the time domain resource location of the previous transmission/retransmission (if any) to the relay node in each transmission, the source node can determine the value of K based on the initial transmission. For the above three methods, after receiving the K, the relay node can determine the latency requirement for forwarding the information to the remote node based on the K.

If which transmission is used to determine the latency requirement indicated by the source node to the relay node is based on the specific transmission manner, one method is to (pre) define or (pre) configure a fixed mapping relationship between the two, then both the source node and the relay node of the sidelink service can determine which transmission is used to determine the latency requirement indicated by the source node to the relay node according to a specific transmission manner, for example, whether HARQ-based transmission is enabled. Similarly, if which transmission is used to determine the latency requirement indicated by the source node to the relay node is based on other parameters (e.g., priority of the service, the identity of the source node/relay node/remote node, the geographical location information of the source node/relay node/remote node, etc.), or can also be (pre) defined or (pre) configured a fixed mapping relationship between the information used to determine which transmission is used to determine the latency requirement and the other parameters, and correspondingly deduce information about which transmission is used to determine the latency requirement. In addition, another method is to explicitly or implicitly indicate information about which transmission is used to determine the latency requirement, for example, the SCI indicates the information through a specific field; the scenario to which this method is applicable is independent of how the information about which transmission is used to determine the latency requirements is determined.

Optionally, the sidelink data of the source node arrives at the higher layer of the source node in slot n, and its basic latency requirement is k, that is, the source node expects that the data should be transmitted to the remote node at the time no later than slot n+x. The source node transmits the sidelink data to the relay node, including transmitting the sidelink data for the first time in slot n+k0, and retransmitting the sidelink data once in slots n+k1, n+k2, and n+k3, respectively. According to the different manners that the source node determines the latency requirement indicated by the source node to the relay node based on a certain transmission, the specific implementation of the source node indicating the latency requirement, and the relay node determines the time range corresponding to the forwarding by the latency requirement indicated by the source node, and include any of the following:

The latency requirement indicated by the source node is determined based on the initial transmission of the information that the source node needs to forward, and accordingly, the indicated value is x−k0; the relay node determines to forward the information from the source node to the relay node at the time no later than (n+k0)+(x−k0) according to the slot of the time point for the initial transmission and latency requirement indicated by the source node; further, the source node uses this method while performing HARQ-based transmission and blind retransmission, and indicates that the latency requirement is x−k0 in the total four transmission (initial transmission and three retransmission); further, in order to avoid the relay node which is used as a receiving end misses the initial transmission of the source node in the slot n+k0, the source node indicates the resource location of the previous transmission of the data corresponding to the transmission in each transmission, and the resource location includes at least the time domain location of the initial transmission of the data the location and the time domain location of other retransmissions of the data, as well as the frequency domain location of the first and/or other retransmissions;

the latency requirement indicated by the source node is determined based on the last transmission of the source node to transmit the information to be forwarded, and accordingly, the indicated value is x–k3; and the relay node determines that it is necessary to forward the information from the source node to the relay node at the time no later than (n+k3)+(x–k3) according to the slot of the time point of the last transmission and the latency requirement indicated by the source node x–k3; further, while the source node uses the transmission manner based on the blink retransmission, since the source node determines the total number of blink retransmission of the data and correspondingly selects the transmission resource of each blink retransmission before the initial transmission, the source node can determine the time point of the last transmission before the initial transmission and correspondingly use this method, and indicates that the latency requirement is x–k3 in the total four transmission; further, in order to avoid the case that the relay node acted as the receiving end misses the last transmission of the source node in slot n+k3, the source node indicates the resource location of the subsequent transmission of the data corresponding to the transmission in each transmission, and the resource location includes at least the time domain location of the last transmission of the data, and may also include other time domain location of other retransmission of data, as well as frequency domain location of the last and/or other retransmission;

When the latency requirement indicated by the source node is indicated in a certain signaling, it is determined based on the transmission of the signaling transmitted by the source node. Correspondingly, in the four transmission of which transmission time is n+k0, n+k1, n+k2 and n+k3, the indicated latency requirements are respectively x–k0, x–k1, x–k2, x–k3; the relay node determines to forward the information from the source node to the relay node at the time no later than (n+k')+(x–k') according to slot n+k' of the time point of each one transmission and the latency requirement n+k' indicated in this transmission; wherein k' is any one of k0, k1, k2, and k3; further, when the source node uses the HARQ-based transmission manner, since it is not sure how many transmissions are needed to successfully transmit the data to the relay node, so it is more suitable to use this method, and in each transmission, the corresponding latency requirement is indicated according to the time point of the current transmission.

Optionally, for which transmission is used to determine the direct indication in the indication method of the latency requirement indicated by the source node to the relay node, the direct indication is carried in the signaling for indicating the latency requirement.

Optionally, the relay node determines that the available time range for transmitting the information to be forwarded to the relay node does not exceed the latency requirement according to the latency requirement indicated by the source node. In a specific example, the relay node receives the information from the source node in slot n, successfully decodes the information in slot n+k0, and determines that the information needs to be forwarded to the remote node, whose latency requirement is x; the relay node needs to forward the information to the remote node, and the forwarding time is before the slot n+x, or not later than the slot n+x.

Optionally, the relay node obtain latency requirement indirectly indicated by the source node further includes the relay node obtains the transmission latency for transmitting the information to be forwarded by the source node to the relay node indicated by the source node, and the basic latency requirement for the relay node determining the information to be forwarded from the source node and/or from the higher layers of the relay node itself, and determines the latency requirement of the information to be forwarded according to the basis latency requirement and the transmission latency indicated by the source node. Wherein, the transmission latency is the time offset between the time point where the source node transmits the information to be forwarded to the relay node and the time point where the information to be forwarded is generated at the source node.

Optionally, the source node determines that the information to be forwarded arrives at the higher layer of the source node in slot m0, and transmits the information to be forwarded to the relay node in slot m1, and finishes transmitting the information in slot m2; then the latency requirement indicated by the source node is m1–m0, or m2–m0, or m0. Specifically, if the source node is a sidelink UE, the slot m1 may be the slot that the source node transmits the PSSCH carrying the information to be forwarded, and the slot m2 may be the last slot that the source node transmits the PSSCH carrying the information to be forwarded, or the slot where the source node last transmits the feedback channel PSFCH corresponding to the PSSCH carrying the information to be forwarded. If the source node is a base station, the definition of slots m1 and m2 is similar to the case where the source node is a sidelink UE, but the PSSCH is replaced by the PDSCH, and the PSFCH is replaced by the PUCCH.

Optionally, for the blind retransmission-based manner, the source node can estimate the value of m2 through resource selection and resource reservation before transmitting; but for the HARQ-based manner, the source node cannot know the value of m2 in advance. For both manners, the source node can extract the value of knowing m1. Therefore, a possible manner is: for the HARQ-based manner, if the source node indicates m2–m0 in a certain transmission/retransmission, the value of m2 is the sequence number of the transmission/retransmission slot. Another possible manner is: if the source node uses blind retransmission to transmit the information, the transmission latency indicated by the source node is m2–m0; if the source node uses HARQ-based transmission to transmit the information, the transmission latency indicated by the source node is m1–m0; in addition, optionally, in HARQ-based transmission and/or blind retransmission, in each transmission/retransmission of a given TB, the source node indicates the resource location of the previous transmission/retransmission of the TB (if any).

Optionally, the relay node obtains the basic latency requirement of the service. For example, according to the priority of the service, the priority may be determined by the QoS indicated in the SCI, and the basic latency requirement corresponding to the priority is determined as x. The relay node determines the latency requirement of the information to be forwarded as x–m according to the basic latency requirement x and the transmission latency m indicated by the source node. In correspondence to the above possible manner for the source node to determine the indicated transmission latency, if the relay node receives the information from the source node transmitted in an HARQ-based manner, and the source node indicates that the transmission latency is m=m2–m0 in the transmission/retransmission. Since the value of m2 is the sequence number of the transmission/retransmission slot, the relay node determines that the latency requirement of the information to be forwarded is x−m. In correspondence to another possible manner in which the source node determines the indicated transmission latency above, if the relay node receives the information transmitted from the source node based on the blind retransmission, and the transmission latency indicated in the transmission/retransmission by the source node is m, then the relay node determines that the latency requirement of the information to be forwarded is x−m, since the relay node assumes that the transmission latency indicated by the source node in the transmission/retransmission is m=m2−m0; as the value of m2 is the sequence number of the transmission/retransmission slot, that is, m=m2−m0 corresponds to the actual transmission latency of the source node to transmit the transmission/retransmission, the latency requirement is determined by directly using m indicated in the transmission; or if the relay node receives the information from the source node transmitted based on HARQ, and the transmission latency indicated in the transmission/retransmission by the relay node, then the relay node determines the latency requirement of the information to be forwarded is x−m−m', m'=m2−m1, wherein m2 is the sequence number of the received transmission/retransmission slot transmitted by the source node and m1 is sequence number of the slot of the initial transmission of the TB carrying the transmission/retransmission, since the relay node assumes that the transmission latency indicated in the transmission/retransmission by the source node is m=m1−m0, and accordingly it is necessary to use the m indicated in this transmission and the time gap between this transmission and the initial transmission to determine the latency requirement.

Optionally, the relay node determines that the available time range for transmitting the information to be forwarded to the relay node does not exceed the latency requirement according to the latency requirement indicated by the source node, and further includes at least one of the following:

the relay node needs to forward the information to the remote node, and the time of the forwarded initial transmission does not exceed the latency requirement;

the relay node needs to forward the information to the remote node, and the time of at least N forwarded transmissions and/or retransmissions does not exceed the latency requirement;

the relay node needs to forward the information to the remote node, and the time of the forwarded total transmission and/or retransmission does not exceed the latency requirement.

Optionally, if the relay node forwards the information to the remote node in a blind retransmission-based manner, any one of the above may be used. If the relay node uses the HARQ-based manner to forward the information to the remote node, the first two of the above three items can be used.

Optionally, the relay node needs to forward the information to the remote node, wherein the forwarding time is before the slot n+x, or not later than the slot n+x, and accordingly, the forwarding also includes at least one of the following:

the relay node needs to forward the information to the remote node, and the time of the forwarded initial transmission is before the slot n+x, or not later than the slot n+x;

the relay node needs to forward the information to the remote node, and the time of the forwarded first N transmissions and/or retransmissions is before the slot n+x, or not later than the slot n+x;

the relay node needs to forward the information to the remote node, and the time of the forwarded entire transmission and/or retransmission is before the slot n+x, or not later than the slot n+x.

The relay node forwarding the information from the source node to the remote node, further includes at least one of the following:

after the relay node receives the information from the source node and decodes it successfully, it forwards the information to the remote node;

after receiving the information from the source node, the relay node does not decode it and forwards the information directly to the remote node.

Optionally, the successful decoding in the above method includes at least one of the following: successful decoding at the physical layer, successful decoding at the MAC layer and/or RLC layer and/or PDCP layer, and successful decoding at the RRC layer.

Optionally, if the information from the source node in the above method is the PSSCH (or other data channel, such as PDSCH) transmitted by the source node, and does not include the PSCCH (or other control information/channel, such as PDCCH) transmitted by the source node and/or PSFCH (or other feedback information/channel, such as PUCCH).

The main difference between the above two methods is whether the relay node needs to at least ensure that the relay node receives the information correctly before forwarding the information of the source node to the remote node, that is, whether the decoding is successful.

Optionally, for the former method, after receiving the information from the source node and decoding it successfully, the relay node may forward the information to the remote node as it is. The success of decoding in this process is mainly used to judge the reliability of the information.

Alternatively, after the relay node receives the information from the source node and decodes it successfully, it may regenerate the decoded information content into an information message, that is, there is a process of regenerating data, and then forward the regenerated information to the remote node. In this process, the relay node can adaptively adjust the transmission parameters in the process of forwarding information from the source node to the remote node according to various factors, such as the state of the service data of the relay node itself to be transmitted externally and the radio link quality between the relay node and the remote node. For example, when the relay node receives the information from the source node and the relay node forwards the information to the remote node, it may use different physical layer parameters such as MCS, TBS and the like, or may involve segmentation of the MAC layer and/or RLC layer (segmentation) and a restructuring process.

Optionally, the main advantage that the relay node forwards the information from the source node after the relay node correctly receives the information from the source node, the relay node ensures that the information forwarded by itself is the correct information instead of forwarding the falsely received information which cannot be decoded by itself. In addition, the relay node can improve the performance of the forwarding behavior by adjusting the transmission parameters adaptively according to its own state and the link state with the remote node. However, this method needs to at least complete the decoding process of the physical layer, and may also need to complete the decoding process of the MAC layer and/or RLC layer, and the relative latency is relatively large.

Optionally, for the latter method, the relay node does not need to decode the received information from the source node but directly forwards the received information to the remote node as it is, or simply uses the forward error correction code to determine whether the information from the source node is correct, and forward the received information determined by the forward error correction code to the remote node. A typical application of this method in the prior art is a layer 1 forwarder, which is sometimes referred to as a repeater. The advantage of this method is that the complexity of the forwarding operation at the relay node is low, and the forwarding latency can be minimized; the disadvantage is that the unsuccessfully received error information may be forwarded without decode verification and absent channel re-encoding will also cause the decoding quality of the forwarding link from the relay node to the remote node to degrade, so the resource utilization efficiency is relatively low.

Optionally, the relay node forwarding the information from the source node to the remote node according to the latency requirement, further includes at least one of the following:

if the latency requirement meets a given first interval, the relay node does not decode after receiving the information from the source node, and directly forwards the information to the remote node;

if the latency requirement meets a given second interval, the relay node receives the information from the source node and decodes it successfully, and then forwards the information to the remote node.

Optionally, when the latency requirement indicated by the source node is lower than a specific threshold, the relay node forwards it directly to the remote node without decoding after receiving the information of the source node each time. When the latency requirement indicated by the source node is higher than a specific threshold, the relay node transmits the information to the remote node if the information is decoded successfully after receiving the information of the source node each time. In another specific example, when the latency requirement indicated by the source node is higher than the specific threshold, the relay node transmits the information to the remote node if the information is decoded successfully at the MAC layer and/or RLC layer after receiving the information of the source node each time.

Optionally, taking the scenario where the source node is a sidelink UE as an example, the overall flow of the forwarding is explained in conjunction with a specific example:

The relay node receives a certain transmission of the PSSCH transmitted by the source node, the relay node decodes the SCI associated with the PSSCH and determines that the PSSCH needs to be forwarded to the remote node, and the latency requirement is lower than a specific threshold; the relay node does not decode the PSSCH, directly forward the PSSCH to the remote node. When the relay node forwards the PSSCH to the remote node on the sidelink channel, the PSCCH or SCI associated with the forwarded PSSCH may be the same as or different from the PSCCH or SCI associated with the PSSCH transmitted by the source node to the relay node;

Alternatively, the relay node receives a certain transmission of the PSSCH transmitted by the source node, the relay node decodes the SCI associated with the PSSCH and determines that the PSSCH needs to be forwarded to the remote node, and the latency requirement is higher than a specific threshold; if the decoding is successful, the PSSCH is forwarded to the remote node; if the decoding is unsuccessful, the receiving the retransmission of the PSSCH is continued until the decoding is successful, and then the PSSCH is forward to the remote node; if the PSSCH has not been successfully decoded, then the PSSCH is not forwarded to the remote node. In addition, when the relay node forwards the PSSCH to the remote node, it may repacketize the data carried in the PSSCH, for example, perform at least one of RLC layer fragmentation, MAC layer grouping, and physical layer generation of PSSCH.

Optionally, if the source node is a base station, the PSSCH transmitted by the source node in the above description may be replaced by a PDSCH, and the PSCCH and SCI transmitted by the source node may be replaced by PDCCH and DCI.

Figure 4:
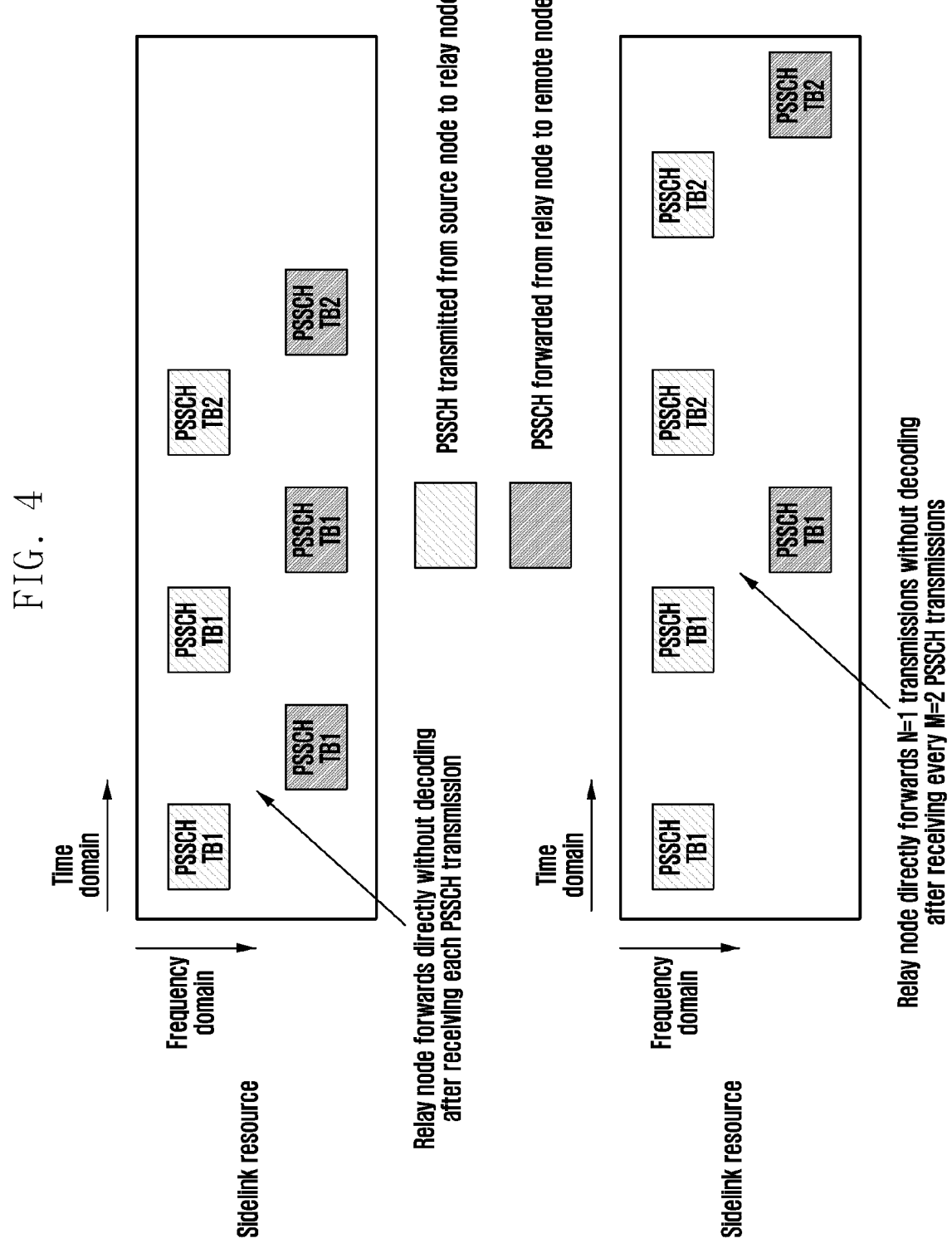
FIG. 4 is a schematic diagram of the timing of relay forwarding when the latency requirement is lower than a specific threshold according to an embodiment of the present application.

Optionally, taking the scenario where the source node is a sidelink UE as an example, a specific example is combined in FIG. 4 to illustrate the timing of the relay forwarding when the latency requirement is lower than a specific threshold:

The source node (transmission to the relay node of the information to be forwarded, which will not be repeated below) uses blind retransmission or HARQ-based transmission, and the relay node directly forwards the PSSCH to the remote node after receiving the PSSCH each time. Further, for this forwarding, one method is that the relay node forwards to remote node once after receiving one transmission of the PSSCH; the other method is that the relay node forwards to the remote node for N times after receiving one or M transmission. Further, if the source node uses HARQ-based transmission, in order to transmits the HARQ feedback to the source node, the relay node needs to decode the PSSCH without forwarding after decoding successfully/decoding completed, but directly forwarding the PSSCH to the remote node; if the source node uses blind retransmission, the relay node may or may not decode the PSSCH.

Figure 5:
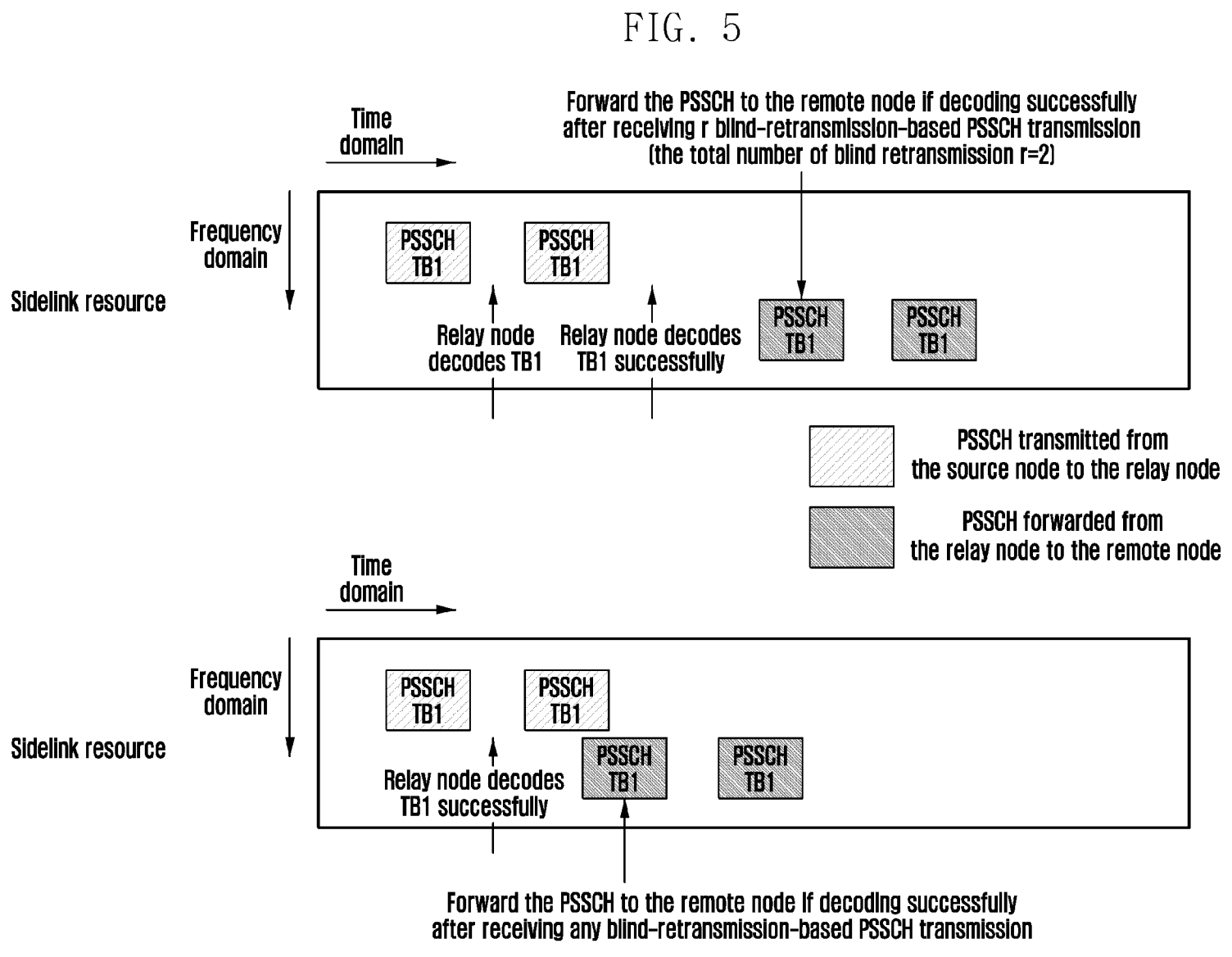
Figure 6:
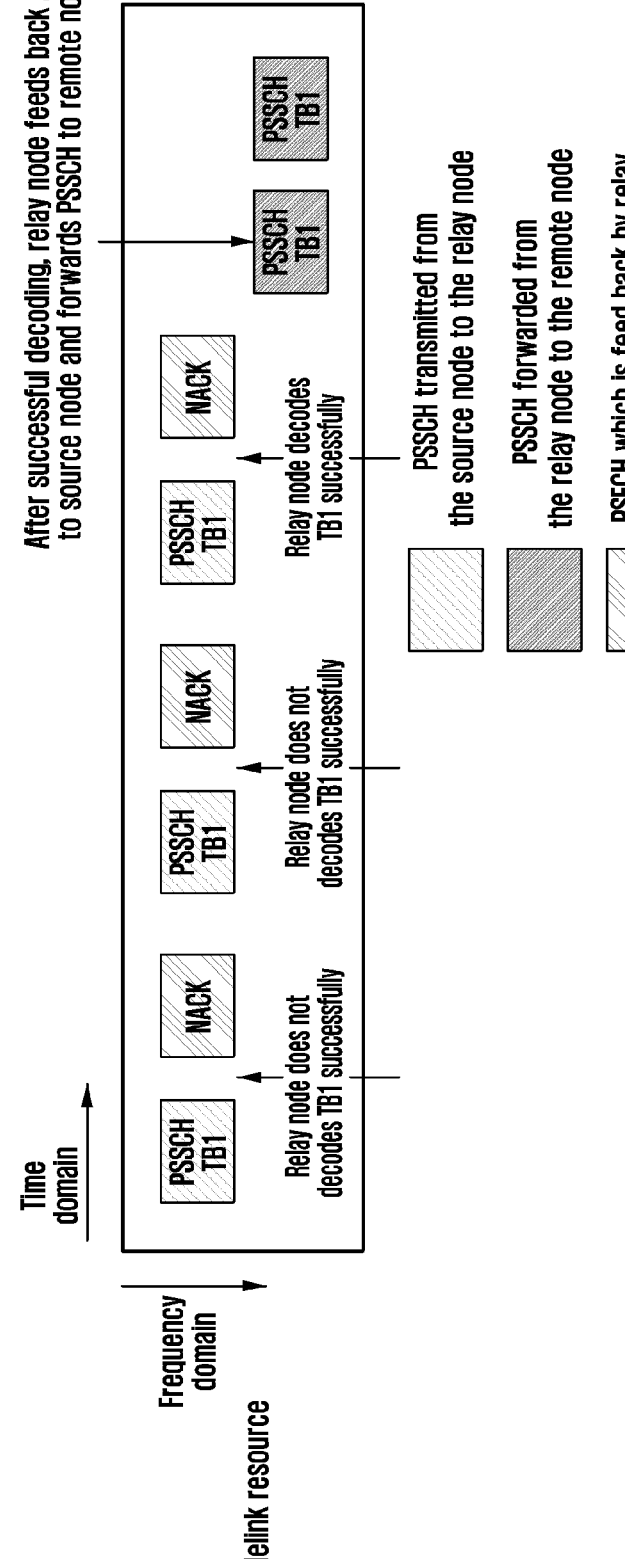
FIG. 6 is a schematic diagram of the timing of relay forwarding when the latency requirement is higher than a specific threshold according to an embodiment of the present application.

Optionally, taking the scenario where the source node is a sidelink UE as an example, a specific example is illustrated in FIGS. 5 and 6 to illustrate the timing of the relay forwarding when the latency requirement is higher than a specific threshold:

the source node uses blind retransmissions for a total of r transmissions. As shown in FIG. 5, after receiving a total of r blind retransmissions, the relay node forwards the PSSCH to the remote node if the decoding is successful; or in the process that the relay node receives the blink retransmission of the source node and decodes successfully, the relay node forwards the PSSCH to the remote node if the decoding is successful after receiving any one transmission;

the source node uses HARQ-based transmission. As shown in FIG. 6, the relay node receives the source node's transmission according to the existing mechanism and performs HARQ-ACK feedback. After the decoding is successful, the ACK is fed back, and then the PSSCH is forwarded to the remote node.

It should be noted that this example is only used to explain a logical relationship between the timing of receiving and forwarding of the relay node, and does not construct any limitation on other timing relationships specifically applied in this example, such as the resource location where the relay node feed the PSFCH back. For example, the time point when the relay node feeds back the ACK to the remote node in FIG. 6 may also be at another location; for example, after obtaining the ACK/NACK feedback from the remote node.

Wherein, the first interval and/or the second interval may be determined according to at least one of the following: cast type, priority, basic latency requirement of the service, and the transmission type adopted by the node is blind retransmission or HARQ-based retransmission, transmission is broadcast/multicast/unicast, geographic location information, node identification, resource pool configuration, PSFCH time domain period N in the resource pool configuration, and channel busy ratio (CBR) of the resource pool. Wherein, the node includes a source node and/or a relay node and/or a remote node.

Optionally, the relay node forwards the information from the source node to the remote node according to the latency requirement, and further includes: when transmitting the information from the source node to the remote node, determining or adjusting at least one of the following according to the latency requirement item:

A time window for channel sensing; further, at least one of a start time point, an end time point, and a time window length of the time window;

an energy threshold used to determine whether to exclude resources during channel sensing;

an available time range of the resources used for transmission, and/or the time range of resource reservation.

The technical solution provided by the embodiments of the present application has at least the following beneficial effects:

The relay node forwards the information to be forwarded to the remote node according to the latency requirement of the information to be forwarded, which satisfies the requirements of services with high latency requirement.

Embodiment 2

Figure 7:
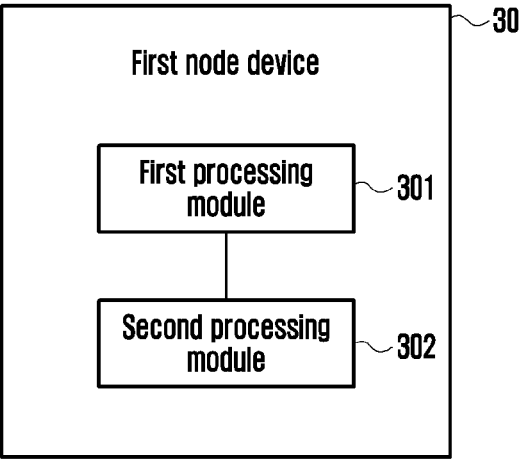
FIG. 7 is a schematic structural diagram of a first node device according to an embodiment of this application.

Based on the same inventive concept as the foregoing embodiment 1, an embodiment of the present application further provides a first node device. A schematic structural diagram of the first node device is shown in FIG. 7. The first node device 30 includes a first processing module 301 and a second processing module 302.

The first processing module 301 is configured to obtain, from the second node, a latency requirement of information to be forwarded and the information to be forwarded;

The second processing module 302 is configured to forward, to the third node, the information to be forwarded according to the latency requirement of the information to be forwarded.

Optionally, the obtaining a latency requirement of information to be forwarded includes:

obtaining the latency requirement from the second node when determining that the information is required to be forwarded to the third node.

Optionally, the manner for obtaining the latency requirement from the second node includes at least one of the following:

obtaining the latency requirement indicated in a physical layer signaling by the second node;

obtaining the latency requirement indicated in a media access control (MAC) signaling or another layer 2 signaling by the second node;

obtaining the latency requirement indicated in a radio resource control (RRC) signaling or another higher layer signaling by the second node.

Optionally, the physical layer signaling includes sidelink control information (SCI), and when the physical layer signaling is the SCI, the latency requirement indicated in the physical layer signaling is the latency requirement of sidelink data associated with the SCI;

the MAC signaling includes at least one of an MAC control element CE (MAC CE), an MAC header, and an MAC sub-header.

Optionally, the latency requirement is directly or indirectly indicated by at least one of the following:

a time at which the information is generated at the second node, basic latency requirement of the information, a time offset between time at which the second node transmits the information to the first node and time at which the information is generated at the second node, or a specific time length within which the first node is required to transmit the information to the third node.

Optionally, the latency requirement includes an indirect indicated latency requirement, and the manner for determining the indirect indicated latency requirement includes:

obtaining a transmission latency indicated by the second node, and determining the basic latency requirement of the information from an higher layer of the second node and/or the first node, the transmission latency including a time offset between the time at which the second node transmits the information to the first node and the time at which the information is generated at the second node;

determining a latency requirement of the information according to the basic latency requirement and the transmission latency.

Optionally, when the information is transmitted by the second node for multiple times, the latency requirement includes at least one of the following:

latency requirement determined based on the initial transmission of the information by the second node;

latency requirement determined based on the last transmission of the information by the second node;

latency requirement determined, when the latency requirement is indicated in one transmission in which the second node transmits the information, based on the one transmission.

Optionally, the manner for determining the latency requirement is based on a transmission manner for transmitting the information by the second node, and the transmission manner includes at least one of Hybrid Automatic Repeat request (HARQ)-based transmission and blind retransmission.

Optionally, the manner of forwarding, to the third node, the information to be forwarded according to the latency requirement of the information to be forwarded includes at least one of the following:

forwarding, to the third node, the information to be forwarded, wherein the time of the forwarded initial transmission does not exceed the latency requirement;

forwarding, to the third node, the information to be forwarded, wherein the time of at least forwarded first N transmissions and/or retransmissions does not exceed the latency requirement, and N is a positive integer;

forwarding, to the third node, the information to be forwarded, wherein the time of the forwarded total transmission and/or retransmission does not exceed the latency requirement.

Optionally, the forwarding the information to be forwarded to a third node according to the latency requirement of the information to be forwarded includes:

forwarding the information to the third node without decoding after receiving the information, in the case that the latency requirement meets a given first interval; and/or forwarding the information to the third node after the received information is decoded successfully, in the case that the latency requirement meets a given second interval, after receiving the information and decoding successfully.

Optionally, when transmitting, to the third node, the information to be forwarded, a parameter for selecting a sidelink resource according to the latency requirement is determined or adjusted.

Optionally, the parameter includes at least one of a time window for channel sensing, an energy threshold used for determining whether to exclude resources during channel sensing, an available time range for resources used for transmission, and time range for resource reservation, and the time window for channel sensing includes at least one of a start time point, an end time point, and a time window length of the time window.

The technical solution provided by the embodiments of the present application has at least the following beneficial effects:

By obtaining, from the second node, the latency requirement of information to be forwarded and the information to be forwarded and forwarding, to the third node, the information to be forwarded according to the latency requirement of the information to be forwarded, thus the first node forwards the information to be forwarded to the third nod according to the latency requirement of the information to be forwarded, which satisfies the requirements of services with higher latency requirements.

For the content not detailed in the first node device provided by the embodiment of the present application, reference may be made to the above method for information transmission. The beneficial effects that the first node device provided by the embodiment of the present application can achieve are the same as the above method for information transmission.

Figure 8:
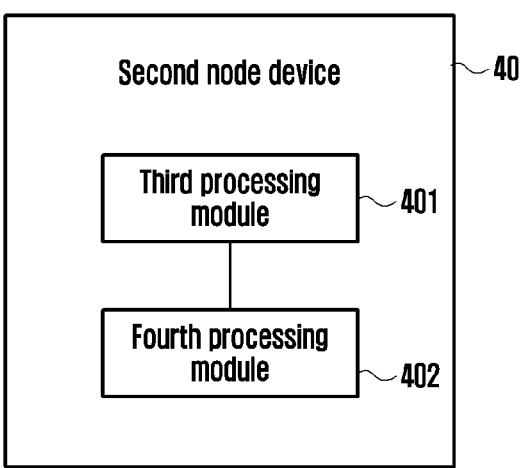
FIG. 8 is a schematic structural diagram of a second node device according to an embodiment of the present application.

Based on the same inventive concept of the foregoing embodiment 1, an embodiment of the present application further provides a second node device. A schematic structural diagram of the second node device is shown in FIG. 8. The second node device 40 includes a third processing module 401 and a processing module 402.

The third processing module 401 is configured to transmit information that is required to be transmitted to a third node, to a first node;

The fourth processing module 402 is configured to transmit a latency requirement corresponding to the information that is required to be transmitted to the third node, to the first node.

Optionally, the manner of transmitting the latency requirement corresponding to the information that is required to be transmitted to the third node, to the first node, includes at least one of the following:

indicate a latency requirement in physical layer signaling;

indicate a latency requirement in media access control MAC signaling or other layer 2 signaling;

indicate a latency requirement in radio resource control RRC signaling or another higher layer signaling.

Optionally, the physical layer signaling includes sidelink control information (SCI), and when the physical layer signaling is the SCI, the latency requirement indicated in the physical layer signaling is the latency requirement of sidelink data associated with the SCI; the MAC signaling includes at least one of an MAC control element CE (MAC CE), an MAC header, and an MAC sub-header.

Optionally, when the information is transmitted by the second node for multiple times, the latency requirement includes at least one of the following:

latency requirement determined based on the initial transmission of the information by the second node;

latency requirement determined based on the last transmission of the information by the second node; and latency requirement determined, when the latency requirement is indicated in one transmission in which the second node transmits the information, based on the one transmission.

The technical solution provided by the embodiments of the present application has at least the following beneficial effects:

It meets the needs of services with high latency requirements.

For the content not detailed in the second node device provided by the embodiment of the present application, reference may be made to the above method for information transmission. The beneficial effects that the second node device provided by the embodiment of the present application can achieve are the same as the above method for information transmission, and will not be repeated here.

Embodiment 3

Figure 9:
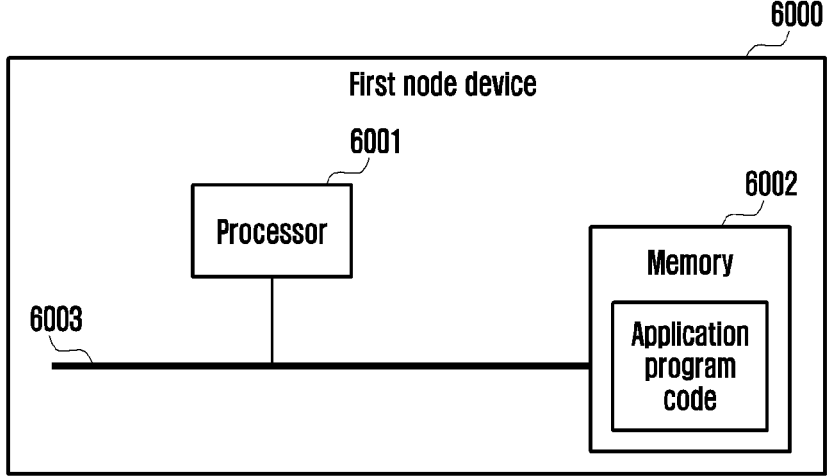
FIG. 9 is a schematic structural diagram of a first node device according to an embodiment of this application.

Based on the same inventive concept, an embodiment of the present application also provides a first node device. A schematic structural diagram of the first node device is shown in FIG. 9. The first node device 6000 includes at least one processor 6001, a memory 6002, and a bus 6003, the at least one processor 6001 is electrically connected to the memory 6002; the memory 6002 is configured to store at least one computer-executable instruction, and the processor 6001 is configured to execute the at least one computer executable instruction, thereby executing steps of executing any method for information transmission as provided in any one of the embodiments of this application or any one of the optional implementation.

Further, the processor 6001 may be a Field-Programmable Gate Array (FPGA) or other devices with logic processing capabilities, such as a Microcontroller Unit (MCU) and a Central Process Unit (CPU).

Application of the embodiments of the present application has at least the following beneficial effects:

It meets the needs of services with high latency requirement.

Figure 10:
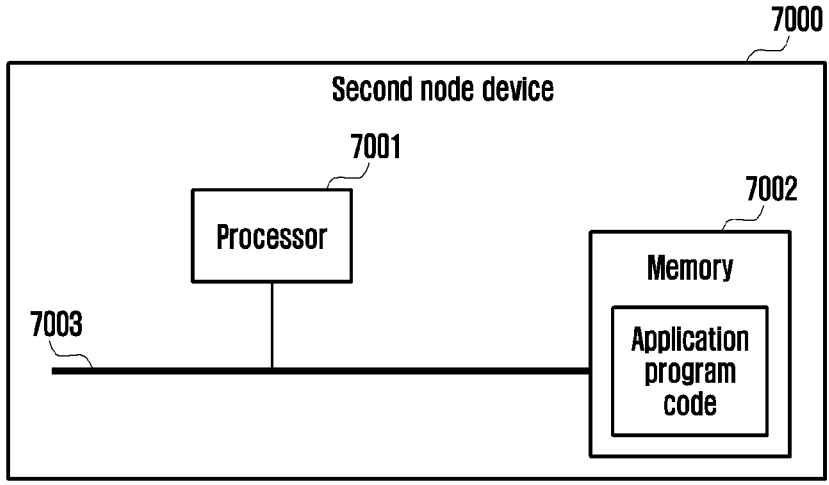
FIG. 10 is a schematic structural diagram of a second node device according to an embodiment of the present application.

Based on the same inventive concept, an embodiment of the present application further provides a second node device. A schematic structural diagram of the second node device is shown in FIG. 10. The second node device 7000 includes at least one processor 7001, a memory 7002, and a bus 7003, the at least one processor 7001 is electrically connected to the memory 7002; the memory 7002 is configured to store at least one computer executable instruction, and the processor 7001 is configured to execute the at least one computer executable instruction, thereby executing steps of executing any method for information transmission as provided in any one of the embodiments of this application or any one of the optional implementation.

Further, the processor 7001 may be a Field-Programmable Gate Array (FPGA) or other devices with logic processing capabilities, such as a Microcontroller Unit (MCU) and a Central Process Unit (CPU).

Application of the embodiments of the present application has at least the following beneficial effects:

It meets the needs of services with high latency requirement.

Reference will now be made in detail to exemplary embodiments of the present disclosure, and examples of the embodiments are illustrated in the accompanying drawings, wherein same reference numerals refer to same parts throughout. The embodiments will be illustrated below, by referring to the accompanying drawings, so as to explain the present disclosure.

In LTE and New Radio (NR) systems, the power of the DG PUSCH and the power of the CG PUSCH are determined according to the parameters which are semi-statically configured by a base station and Transmit Power Commands (TPCs) which are dynamically transmitted by the DCI. According to existing LTE specifications, a transmission power of a PUSCH in a subframe i of a serving cell c is determined according to the following formula:

$$P_{PUSCH,c}(i) = \min \left\{ \begin{array}{l} P_{CMAX,c}(i), \\ 10\log_{10}(M_{PUSCH,c}(i)) + P_{0\_PUSCH,c}(j) + \alpha_c(j) \cdot PL_c + \Delta_{TF,c}(i) + f_c(i) \end{array} \right\} [dBm].$$

The definition of each parameter in the formula can be found in Chapter 5.1.1.1 of version 10.9.0 of 3GPP specification 36.213, and the introduction is as follows:

$P_{CMAX,c}$ (i) is the maximum transmission power on the subframe i of the serving cell c of the configured UE;

$M_{PUSCH,c}$ (i) is the number of Physical Resource Blocks (PRBs) occupied by the PUSCH;

$P_{O\_PUSCH,c}$ (j) is a power offset value configured by a high-level signaling;

$PL_C$ is a link loss measured by the UE;

$\alpha_c(j)$ is a parameter which controls to compensate for all or a part of the link loss;

$f_c(i)$ is an accumulated value of closed-loop power control;

$\Delta_{TF,c}$ (i) is a parameter related to the Modulation and Coding Scheme (MCS) for uplink transmission.

FIG. 11 illustrates a flowchart of a method for transmitting a PUSCH according to an exemplary embodiment of the present disclosure. The method for transmitting the PUSCH as shown in FIG. 11 may be applicable to, for example, but not limited to, a User Equipment (UE).

Referring to FIG. 11, in step S1101, a predetermined measurement is performed.

In an exemplary embodiment of the present disclosure, the predetermined measurement may include at least one of an interference measurement, an energy measurement, and a Listen Before Talk (LBT) measurement.

Specifically, for the CG PUSCH (here, the CG PUSCH is used as an example for description, this method is not limited to the CG PUSCH, but can also be used for transmission of other channels, for example, channel transmission between UE and UE), in order to timely transmit data with low latency requirements, in the case that the TPC determined by the base station according to the interference situation (or the correct rate of PUSCH reception and other factors, only the interference situation will be described as an example later in this application) may not be received by the UE in time, the power control parameters of CG PUSCH may be adjusted through some measurements made by the UE. The adjusted power control parameters of the CG PUSCH may include at least one of a power offset value, a link loss compensation coefficient, and an accumulated value of closed-loop power control to adjust the power of the CG PUSCH. The measurement performed by the UE may include at least one of the interference measurement, the energy measurement, the LBT measurement, and the like.

In step S1102, parameters for transmitting the PUSCH are determined according to the measurement result of the predetermined measurement.

In an exemplary embodiment of the present disclosure, in determining the parameters for transmitting the PUSCH according to the measurement result of the predetermined measurement, the parameters for transmitting the PUSCH may be determined by determining the power control parameters and/or the Modulation and Coding Strategy (MCS) according to the measurement result of the predetermined measurement. In an exemplary embodiment of the present disclosure, power control parameters may include at least one of the power offset value, the link loss compensation coefficient, and the accumulated value of closed-loop power control.

In an exemplary embodiment of the present disclosure, in determining the parameters for transmitting the PUSCH by determining the power control parameters, the power control parameters may be firstly determined according to the measurement result of the predetermined measurement, and then the parameters for transmitting the PUSCH are determined according to the determined power control parameters.

In an exemplary embodiment of the present disclosure, in determining the parameters for transmitting the PUSCH by determining the MCS, the MCS may be firstly determined according to the measurement result of the predetermined measurement, and then the code rate of the PUSCH is determined according to the determined MCS.

In an exemplary embodiment of the present disclosure, in determining the power control parameters according to the measurement result of the predetermined measurement, the measurement result of the predetermined measurement may be firstly compared with a predetermined threshold, and then the power control parameters are determined according to the comparison result.

In an exemplary embodiment of the present disclosure, in determining of the MCS based on the measurement result of the predetermined measurement, the measurement result of the predetermined measurement may be firstly compared with a predetermined threshold, and then the MCS is determined according to the comparison result.

In an exemplary embodiment of the present disclosure, in determining the power control parameters according to the comparison result, the power control parameters may be determined according to a threshold range where the measurement result of the predetermined measurement is located. For example, when the measurement result of the predetermined measurement is in a first threshold range, first power control parameters corresponding to the first threshold range are determined as the power control parameters; when the measurement result of the predetermined measurement is in a second threshold range, second power control parameters corresponding to the second threshold range are determined as the power control parameters; when the measurement result of the predetermined measurement is in a third threshold range, third power control parameters corresponding to the third threshold range are determined as the power control parameters; etc.

In an exemplary embodiment of the present disclosure, in determining the MCS according to the comparison result, the MCS may be determined according to a threshold range where the measurement result of the predetermined measurement is located. For example, when the measurement result of the predetermined measurement is in the first threshold range, a first MCS corresponding to the first threshold range is determined as the MCS; when the measurement result of the predetermined measurement is in the second threshold range, a second MCS corresponding to the second threshold range is determined as the MCS; when the measurement result of the predetermined measurement is in the third threshold range, a third MCS corresponding to the third threshold range is determined as the MCS; etc.

Specifically, the power control parameters of CG PUSCH may be adjusted according to the measurement result. When the interference measured by the UE is relatively large, the transmission power of the CG PUSCH is increased by adjusting the power control parameters to ensure the performance of the CG PUSCH. When the interference measured by the UE is relatively small, the transmission power of the CG PUSCH is decreased by adjusting the power control parameters, to reduce interference to other cells and save power under the premise of ensuring the performance of the CG PUSCH.

In the following, adjusting the by the interference measurement is used as an example. When the measured interference r is within a range [threshold_1, threshold_2], PO_PUSCH,c(j)_1 is used. The specific mapping relationship between the measured interference r and the power control parameters may be as shown in the example in Table 1, which is not limited by the present disclosure.

Table 1 shows the specific mapping relationship between the measured interference r and the power control parameters.

TABLE 1

| measured interference r | power control parameter PO_PUSCH, c(j) |
|---|---|
| r∈[threshold 1, threshold 2] | $P_{O\_PUSCH,\ c}(j)$ 1 |
| r∈[threshold 2, threshold 3] | $P_{O\_PUSCH,\ c}(j)$ 2 |
| r∈[threshold 3, threshold 4] | $P_{O\_PUSCH,\ c}(j)$ 3 |

In Table 1, when threshold_1<threshold_2<threshold_3<threshold_4, the relationship between the PO_PUSCH,c(j)_1, the PO_PUSCH,c(j)_2, the PO_PUSCH,c(j)_3 may be that PO_PUSCH,c(j)_1<PO_PUSCH,c(j)_2<PO_PUSCH,c(j)_3. That is, the larger the measured interference r, the greater $P_{O\_PUSCH,c}(j)$ may be. Specifically, according to the measurement result, the power control parameters can be adjusted in a more timely manner according to the interference situation, so that the performance of the CG PUSCH is guaranteed. However, since the maximum transmission power of the UE is also limited, when the interference is severe while maintaining the current MCS, if the increased power exceeds the maximum power allowed by the UE and the power cannot be increased, the performance is not guaranteed. In this case, in order to ensure the performance of the CG PUSCH, the MCS of the CG PUSCH may be adjusted to reduce the code rate of the CG PUSCH, so that the Block Error Rate (BLER) of the CG PUSCH is guaranteed. The MCS may be adjusted through some measurements performed by the UE. The measurement performed by the UE may include the interference measurement, the energy measurement, the LBT measurement, and so on. After the measurement result is obtained, the MCS is adjusted according to the measurement result. When the interference measured by the UE is relatively large, the code rate is reduced by adjusting the MCS, to ensure the performance of the CG PUSCH. When the interference measured by the UE is relatively small, the code rate of the CG PUSCH is increased by adjusting the MCS, to transmit as much data as possible under the premise of ensuring the performance of the CG PUSCH.

In the following, adjusting the $P_{O\_PUSCH,c}(j)$ by the interference measurement is used as an example. When the measured interference r is within the range [threshold_1, threshold_2], MCS_1 is used. The specific mapping relationship between the measured interference r and the MCS may be as shown in the example in Table 2, which is not limited by the present disclosure.

Table 2 shows the specific mapping relationship between the measured interference r and the MCS.

TABLE 2

| measured interference r | MCS |
|---|---|
| r∈[threshold_1, threshold_2] | MCS_1 |
| r∈[threshold_2, threshold_3] | MCS_2 |
| r∈[threshold_3, threshold_4] | MCS_3 |

According to the measurement result, the MCS can be adjusted in a more timely manner according to the interference situation, and in conjunction with the adjustment method of the power control parameter, the performance of the CG PUSCH can be better guaranteed. In an exemplary embodiment of the present disclosure, the method for transmitting the PUSCH may further include determining MCS indication information according to the determined MCS, and transmitting the determined MCS indication information to the base station. Herein, the MSC indication information is used for indicating the determined MCS.

In an exemplary embodiment of the present disclosure, in transmitting the MCS indication information to the base station, time-frequency resources for transmitting the MCS indication information may be firstly selected from time-frequency resources of the PUSCH, and then the MCS indication information is transmitted to the base station through the selected time-frequency resources.

Specifically, since the UE adjusts the MCS according to the measured interference situation while the base station receiving the CG PUSCH does not know the adjusted MCS, the base station cannot receive the CG PUSCH correctly. Therefore, the UE needs to inform the base station of the adjusted MCS through signaling. The information to inform the base station of MCS adjustment will be described below.

The UE may obtain the time-frequency resources of the CG PUSCH by receiving the activated DCI or the high-level signaling, and then selects a part of the resources from the time-frequency resources of the CG PUSCH for transmitting the MCS indication information. FIG. 12 illustrates a schematic diagram of an example position of a time-frequency resource for transmitting the MCS indication information according to an exemplary embodiment of the present disclosure. For example, as shown in FIG. 12, some Resource Elements (REs) on both sides of or one side of the Demodulation Reference Signal (DMRS) for the CG PUSCH are selected to transmit the MCS indication information. The mapping between the MCS indication information and the MCS can be direct mapping, that is, the value of one piece of MCS indication information corresponds to one index of one MCS. For example, one of 4 MCS indexes is indicated by 2-bit MCS indication information, as shown in the example in Table 3, which is not limited by the present disclosure.

Table 3 shows the mapping relationship between the MCS indication information and the MCS indexes.

TABLE 3

| value of the MCS indication information | MCS index |
|---|---|
| 00 | MCS_1 |
| 01 | MCS_2 |
| 10 | MCS_3 |
| 11 | MCS_4 |

The mapping between the MCS indication information and the MCS indexes can be differential mapping, that is, the value of one MCS indication information corresponds to the MCS index offset value of the CG PUSCH, which is configured relative to the higher layer signaling or is indicated by the activated DCI of the CG PUSCH. For example, one of 4 MCS index offset values is indicated by 2-bit MCS indication information, as shown in the example in Table 4, which is not limited by the present disclosure. Table 4 shows the mapping relationship between the MCS indication information and the MCS index offset value.

TABLE 4

| value of the MCS indication information | MCS index offset value |
|---|---|
| 00 | 1 |
| 01 | 2 |
| 10 | 0 |
| 11 | −1 |

In an exemplary embodiment of the present disclosure, in selecting the time-frequency resources for transmitting the MCS indication information from the time-frequency resources of the PUSCH, the number of the time-frequency resources for transmitting the MCS indication information may be firstly determined, and then the starting points of the time-frequency resources for transmitting the MCS indication information are determined, and the time-frequency resources for transmitting the MCS indication information are determined according to the determined number of the time-frequency resources and the determined starting points of the time-frequency resources. In an exemplary embodiment of the present disclosure, in determining the number of the time-frequency resources for transmitting the MCS indication information, candidate numbers of time-frequency resources for transmitting the MCS indication information may be firstly acquired, and then the number of the time-frequency resources for transmitting the MCS indication information is selected from the candidate numbers of the time-frequency resources for transmitting the MCS indication information, according to the measurement result of the predetermined measurement.

In an exemplary embodiment of the present disclosure, in determining the starting points of the time-frequency resources for transmitting the MCS indication information, the time domain starting point for transmitting the MCS indication information may be firstly determined according to a position of a Demodulation Reference Signal (DMRS), and then the frequency domain starting point for transmitting the MCS indication information is determined according to the frequency domain starting point of the PUSCH.

Specifically, the position of the time-frequency resource for transmitting the MCS indication information may be determined through presetting of a protocol or high-level signaling configuration. For example, the position of the time domain starting point for transmitting the MCS indication information is obtained according to the position of the DMRS, the frequency domain starting point for transmitting the MCS indication information may be obtained according to the frequency domain starting point of the CG PUSCH, and the number of time-frequency resources for transmitting the MCS indication information is determined by the UE. The base station obtains the number of time-frequency resources for transmitting the MCS indication information through blind detection. One feasible method is that the UE may obtain more than one candidate number of time-frequency resources for transmitting the MCS indication information by receiving the high-level signaling or by the presetting of the protocol, and then the UE selects the appropriate number of time-frequency resources for transmitting the MCS indication information according to the interference situation by interference measurement, and transmits the MCS indication information on the time-frequency resources for transmitting the selected MCS indication information. The number of time-frequency resources for transmitting the MCS indication information is adjusted according to the measurement result. When the interference measured by the UE is relatively large, the performance of MCS indication information transmission is ensured by increasing the number of time-frequency resources for transmitting the MCS indication information. When the interference measured by the UE is relatively small, data is transmitted as much as possible under the premise of ensuring the performance of the CG PUSCH by reducing the number of time-frequency resources for transmitting the MCS instruction information.

For example, when the measured interference r is within a range [threshold_1, threshold_2], the number N1 of time-frequency resources for transmitting the MCS indication information is used, and the specific mapping relationship between the measured interference r and the number of time-frequency resources for transmitting the MCS indication information is as shown in the example in Table 5, which is not limited by the present disclosure.

Table 5 shows the mapping relationship between the measured interference r and the number of time-frequency resources for transmitting the MCS indication information.

TABLE 5

| measured interference r | the number of time-frequency resources |
|---|---|
| r∈[threshold_1, threshold_2] | N1 |
| r∈[threshold_2, threshold_3] | N2 |
| r∈[threshold_3, threshold_4] | N3 |

In Table 5, when threshold_1<threshold_2<threshold_3<threshold_4, the relationship between N1, N2, and N3 may be N1<N2<N3. That is, the greater the measured interference r, the greater the number of time-frequency resources for transmitting the MCS indication information. In step S1103, the PUSCH is transmitted based on the parameters for transmitting the PUSCH.

The present application also describes the scrambling of a Physical Downlink Shared Channel (PDSCH).

Currently, for each codeword q of a PDSCH, a bit sequence $$b^{(q)}(0), \ldots, b^{(q)}\left(M_{bit}^{(q)} - 1\right)$$

of a transport block transmitted in each subframe needs to be scrambled before modulation, wherein $$M_{bit}^{(q)}$$

is the number of bits of the codeword q. The specific scrambling operation is performed according to the following formula $\tilde{b}^q(i)=(b^q(i)+c^q(i))$ mod 2.

Wherein, $$\tilde{b}^{(q)}(0), \dots , \tilde{b}^{(q)}(M_{bit}^{(q)} - 1)$$

is a scrambled sequence, mod is the modulo operation, and $c^q$ (i) is a scrambling sequence. The method of generating the scrambling sequence can be found in part 7.2 of the protocol 3GPP TS 36.211 V8.9.0 (2009-12). The generated initial value of the scrambling sequence is cinit=nRNTI 215+q214+nID.

Wherein, $n_{RNTI}$ is the UE's Radio Network Temporary Identifier (RNTI), and the RNTI corresponds to the RNTI that scrambles the CRC of the Physical Downlink Control Channel (PDCCH) scheduling the PDSCH, which may be C-RNTI, MCS-C-RNTI or CS-RNTI. At this time, the PDSCH is a unicast PDSCH, that is, the PDSCH is received by only one UE. The RNTI is a UE-specific RNTI, and the PDCCH is a PDCCH of a UE-specific search space. $n_s$ is a serial number of a slot, nID may be configured by a high-level signaling. If nID is not configured, $$nID = N_{ID}^{cell},$$

wherein $$N_{ID}^{cell}$$

is the identification of a serving cell, and q is the serial number of the codeword.

When the PDSCH is a broadcast/multicast PDSCH, that is, one PDSCH can be received by more than one UE, and this multicast PDSCH is scheduled by the PDCCH of the UE-specific Search Space (USS), the CRC of the PDCCH is scrambled by C-RNTI, MCS-C-RNTI or CS-RNTI, wherein $n_{RNTI}$ scrambles the CRC of the PDCCH scheduling PDSCH, and the $n_{RNTI}$ in the initial value generated by the scrambling sequence of the PDSCH scheduled by this PDCCH needs to be replaced with a value common to UEs of the multicast or broadcast. For example, a parameter XRNTI is configured by a protocol or high-level signaling to replace the $n_{RNTI}$ in the $C_{init}$, $n_{RNTI} \cdot 2^{15} + q \cdot 2^{14} + n_{ID}$ to obtain the initial value generated by the scrambling sequence of the broadcast or multicast PDSCH, that is, $c_{init}$multicast=$X_{RNTI} \cdot 2^{15} + q \cdot 2^{14} + n_{ID}$.

Or, when the PDSCH is a broadcast or multicast PDSCH, the part related to RNTI is removed from the $c_{init}$, for example, $c_{init}$multicast=q$\cdot 2^{14} + n_{ID}$.

In addition, when the DCI for scheduling a broadcast/multicast PDSCH and the DCI for scheduling a unicast PDSCH use the same format, indication information is added into the DCI to indicate whether the scheduled PDSCH is the broadcast/multicast PDSCH or the unicast PDSCH. If the PDSCH is the broadcast/multicast PDSCH, the initial value generated by the scrambling sequence is $c_{init}$ multicast, and if the PDSCH is the unicast PDSCH, the initial value generated by the scrambling sequence is $c_{init}$. This indication information can be 1 bit. For example, when the bit value is "0", the PDSCH is the broadcast/multicast PDSCH; when the bit value is "1", the PDSCH is the unicast PDSCH.

The broadcast/multicast PDSCH and the unicast PDSCH may use the same initial value generated by the scrambling sequence. At this time, the initial value generated by the scrambling sequence used by the broadcast/multicast PDSCH and the unicast PDSCH is irrelevant with the UE-specific RNTI (UE-specific RNTI may be C-RNTI), and may be $c_{init}$multicast=$X_{RNTI} \cdot 2^{15} + q \cdot 2^{14} + n_{ID}$.

The UE may determine the XRNTI value in the initial value generated by the scrambling sequence by receiving the high-level signaling configuration. This RNTI is called a broadcast/multicast RNTI. In addition, the UE may determine the initial value generated by the scrambling sequence as $c_{init}$multicast=q$\cdot 2^{14} + n_{ID}$, by presetting in the protocol.

The UE may determine the DCI format of the initial value generated by the broadcast/multicast scrambling sequence by receiving the high-layer signaling configuration. For example, the UE may determine the DCI format of the initial value generated by the broadcast/multicast scrambling sequence as at least one of DCI format 1_0, DCI format 1_1, and DCI format 1_2, by receiving the high-layer signaling configuration. The DCI format of the initial value generated by using the broadcast/multicast scrambling sequence may be used to schedule the initial transmission and retransmission of the PDSCH transmitting the same data block. For example, if the DCI format of the initial value generated by using the broadcast/multicast scrambling sequence is configured as DCI format 1_0 and DCI format 1_1, the DCI format 1_0 may be used to schedule the PDSCH for the initial transmission of data block-1, and the DCI format 1_1 may be used to schedule the PDSCH for the retransmission of data block-1. After adopting this method, multicast transmission may be used for initial transmission and unicast transmission may be used for retransmission, so that the flexibility of transmission is increased.

The method for transmitting the PUSCH according to the exemplary embodiments of the present disclosure has been described above with reference to FIG. 11 and FIG. 12. Hereinafter, a device for transmitting a PUSCH and units thereof according to the exemplary embodiments of the present disclosure will be described with reference to FIG. 13.

FIG. 13 illustrates a block diagram of a device for transmitting a PUSCH according to an exemplary embodiment of the present disclosure.

Referring to FIG. 13, the device for transmitting the PUSCH includes a measurement execution unit 1301, a parameter determining unit 1302, and a PUSCH transmitting unit 1303.

The measurement execution unit 1301 is configured to perform a predetermined measurement.

In an exemplary embodiment of the present disclosure, the predetermined measurement may comprise at least one of the interference measurement, the energy measurement, and the LBT measurement.

The parameter determining unit 1302 is configured to determine parameters for transmitting the PUSCH according to a measurement result of the predetermined measurement.

In an exemplary embodiment of the present disclosure, the parameter determining unit 1302 may be configured to determine the parameters for transmitting the PUSCH by determining the power control parameters and/or the Modulation and Coding Strategy (MCS) according to the measurement result of the predetermined measurement.

In an exemplary embodiment of the present disclosure, the parameter determining unit 1302 may be further configured to determine the power control parameters according to the measurement result of the predetermined measurement, and to determine the parameters for transmitting the PUSCH according to the determined power control parameters.

In an exemplary embodiment of the present disclosure, the parameter determining unit 1302 may be configured to determine the MCS according to the measurement result of the predetermined measurement, and to determine the PUSCH code rate according to the determined MCS.

In an exemplary embodiment of the present disclosure, the parameter determining unit 1302 may be further configured to compare the measurement result of the predetermined measurement with a predetermined threshold, and to determine the power control parameters according to the comparison result.

In an exemplary embodiment of the present disclosure, the parameter determining unit 1302 may be further configured to compare the measurement result of the predetermined measurement with a predetermined threshold, and to determine the MCS according to the comparison result.

In an exemplary embodiment of the present disclosure, the parameter determining unit 1302 may be further configured to determine the power control parameters according to a threshold range where the measurement result of the predetermined measurement is located. For example, when the measurement result of the predetermined measurement is in a first threshold range, first power control parameters corresponding to the first threshold range are determined as the power control parameters; when the measurement result of the predetermined measurement is in a second threshold range, second power control parameters corresponding to the second threshold range are determined as the power control parameters; when the measurement result of the predetermined measurement is in a third threshold range, third power control parameters corresponding to the third threshold range are determined as the power control parameters.

In an exemplary embodiment of the present disclosure, the parameter determining unit 1302 may be further configured to determine the MCS according to a threshold range where the measurement result of the predetermined measurement is located. For example, when the measurement result of the predetermined measurement is in the first threshold range, a first MCS corresponding to the first threshold range is determined as the MCS; when the measurement result of the predetermined measurement is in the second threshold range, a second MCS corresponding to the second threshold range is determined as the MCS; when the measurement result of the predetermined measurement is in the third threshold range, a third MCS corresponding to the third threshold range is determined as the MCS.

In an exemplary embodiment of the present disclosure, the device for transmitting the PUSCH may further comprise an indication information determining unit configured to determine MCS indication information, which is used for indicating the determined MCS, according to the determined MCS, and an indication information transmitting unit configured to transmit the determined MCS indication information to the base station.

In an exemplary embodiment of the present disclosure, the indication information transmitting unit may be further configured to select time-frequency resources for transmitting the MCS indication information from time-frequency resources of the PUSCH, and to transmit the MCS indication information to the base station through the selected time-frequency resources.

In an exemplary embodiment of the present disclosure, the indication information transmitting unit may be further configured to determine the number of the time-frequency resources for transmitting the MCS indication information, to determine the starting points of the time-frequency resources for transmitting the MCS indication information, and to determine the time-frequency resources for transmitting the MCS indication information according to the determined number of the time-frequency resources and the determined starting points of the time-frequency resources.

In an exemplary embodiment of the present disclosure, the indication information transmitting unit may be further configured to acquire candidate numbers of time-frequency resources for transmitting the MCS indication information, and to select the number of the time-frequency resources for transmitting the MCS indication information from the candidate numbers of the time-frequency resources for transmitting the MCS indication information according to the measurement result of the predetermined measurement.

In an exemplary embodiment of the present disclosure, the indication information transmitting unit may be further configured to determine the time domain starting point for transmitting the MCS indication information according to a position of a Demodulation Reference Signal (DMRS), and to determine the frequency domain starting point for transmitting the MCS indication information according to the frequency domain starting point of the PUSCH.

The PUSCH transmitting unit 1303 is configured to transmit the PUSCH based on the parameters for transmitting the PUSCH.

It should be noted that the device for transmitting the PUSCH shown in FIG. 13 may be used to execute the method of the foregoing method embodiment, and details are not described herein again.

In addition, according to the exemplary embodiments of the present disclosure, a computer readable storage medium stored with a computer program is provided. When the computer program is executed the method for transmitting the PUSCH according to the present disclosure is implemented.

In an exemplary embodiment of the present disclosure, the computer readable storage medium can carry one or more programs that, when executed, the follow steps may be implemented: performing a predetermined measurement; determining parameters for transmitting the PUSCH according to a measurement result of the predetermined measurement; and transmitting the PUSCH based on the parameters for transmitting the PUSCH.

The computer readable storage medium may be, for example, but not limited to, an electronic, magnetic, optical, electromagnetic, infrared, or semiconductor system, device, or, equipment or any combination of the above. More specific examples of computer readable storage media may include, but not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above mentioned. In the embodiments of the present disclosure, a computer readable storage medium may be any tangible medium that can contain or store a computer program, which can be used by or in connection with an instruction execution system, device, or, equipment. The computer program embodied on the computer readable storage medium can be transmitted by any suitable medium, including but not limited to: wire, fiber optic cable, RF (radio frequency), etc., or any suitable combination of the foregoing. The computer readable storage medium can be included in any device; it can also be present separately and not incorporated into the device.

The device for transmitting the PUSCH according to the exemplary embodiments of the present disclosure has been described above with reference to FIG. 13. Hereinafter, a user equipment according to the exemplary embodiments of the present disclosure will be described with reference to FIG. 14.

FIG. 14 illustrates a schematic diagram of a user equipment, according to an exemplary embodiment of the present disclosure.

Referring to FIG. 14, the user equipment 14 according to an exemplary embodiment of the present disclosure includes a memory 1401, a processor 1402, and a computer program which is stored on the memory and operable on the processor 1402, and when the computer program is executed by the processor 1402, a method for transmitting the PUSCH according to the present disclosure is implemented.

In an exemplary embodiment of the present disclosure, when the computer program is executed by a processor 1402, the follow steps may be implemented: performing a predetermined measurement; determining parameters for transmitting the PUSCH according to a measurement result of the predetermined measurement; and transmitting the PUSCH based on the parameters for transmitting the PUSCH.

The user equipment shown in FIG. 14 is only an example, and should not impose any limitation on the functions and scope of use of the embodiments of the present disclosure.

The method and device for transmitting the PUSCH according to an exemplary embodiment of the present disclosure have been described above with reference to FIG. 11 to FIG. 14. However, it should be understood that the device for transmitting the PUSCH and units thereof shown in FIG. 13 may be respectively configured to execute software, hardware, firmware, or any combination of them of a specific function. The user equipment as shown in FIG. 14 is not limited to including the components shown above, but some components may be added or deleted as needed, and the above components may also be combined.

The method and device for transmitting the PUSCH can implement adjustment of the PUSCH transmission parameters and improve the performance of the PUSCH by performing a predetermined measurement, determining parameters for transmitting the PUSCH according to a measurement result of the predetermined measurement, and transmitting the PUSCH based on the parameters for transmitting the PUSCH.

While the present disclosure has been shown and described with reference to certain exemplary embodiments thereof, it should be understood by those skilled in the art that various changes in form and details may be made therein without departing from the principle and spirit of the present disclosure which are defined by the appended claims.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely preferred embodiments of the present invention. It should be noted that, for a person of ordinary skill in the art, various modifications and embellishments can be made without departing from the principle of the present invention. Such modifications and embellishments shall be regarded as falling into the protection scope of the present invention.

The invention claimed is:

1. A method performed by a first node for transmitting information, the method comprising:
    obtaining, from a second node, information;
    obtaining, from the second node, a latency requirement of the information;
    determining, based on the latency requirement of the information, whether to forward the information to a third node; and
    forwarding, to the third node, the information based on a determination that the information is forwarded to the third node,
    wherein the latency requirement is obtained from the second node via a physical layer signaling and the latency requirement is associated with a time offset between a time at which the second node transmits the information to the first node and a time at which the information is generated at the second node, and
    wherein in case that the information is obtained multiple times from the second node, the latency requirement is determined based on a last transmission of the information, and
    wherein in case that the latency requirement is lower than a threshold, the information is forwarded to the third node without decoding, and in case that the latency requirement is higher than the threshold, the information is forwarded to the third node after decoding.

2. The method of claim 1, wherein when the latency requirement is indirectly indicated, the method further comprising:
    obtaining transmission latency indicated by the second node and determining a basic latency requirement of the information received from a higher layer of the second node or the first node, the transmission latency comprising the time offset between the time at which the second node transmits the information to the first node and the time at which the information is generated at the second node; and

determining the latency requirement of the information based on the basic latency requirement and the transmission latency.

3. The method of claim 1, further comprising at least one of:

forwarding, to the third node, the information, wherein a time of a forwarded initial transmission does not exceed the latency requirement;

forwarding, to the third node, the information, wherein a time of at least one of a forwarded first N transmissions or retransmissions does not exceed the latency requirement and N is a positive integer value; or forwarding, to the third node, the information, wherein a time of at least one of a forwarded total transmission or retransmission does not exceed the latency requirement, wherein forwarding, based on the latency requirement of the information, the information to a third node comprises:

forwarding the information to the third node without decoding after receiving the information when the latency requirement meets a given first interval; and forwarding the information to the third node after the received information is decoded successfully when the latency requirement meets a given second interval.

4. The method of claim 1, further comprising:

determining or adjusting a parameter for selecting a sidelink resource when transmitting, to the third node, the information based on the latency requirement, wherein the parameter comprises at least one of a time window for channel sensing, an energy threshold used for determining whether to exclude resources during channel sensing, an available time range for resources used for transmission, or a time range for resource reservation, and wherein the time window for channel sensing comprises at least one of a start time point, an end time point, or a length of the time window.

5. A method performed by a second node for transmitting information, the method comprising:

transmitting, to a first node, information that is required to be transmitted to a third node; and transmitting, to the first node via a physical layer signaling, a latency requirement corresponding to the information that is required to be transmitted to the third node, wherein the latency requirement is associated with a time offset between a time at which the second node transmits the information to the first node and a time at which the information is generated at the second node, wherein in case that the information is transmitted multiple times from the second node to the first node, the latency requirement is determined based on a last transmission of the information, and wherein in case that the latency requirement is lower than a threshold, the information is forwarded from the first node to the third node without decoding, and in case that the latency requirement is higher than the threshold, the information is forwarded from the first node to the third node after decoding.

6. A first node comprising:

a transceiver; and a processor coupled with the transceiver and configured to:

obtain, from a second node, information,

obtain, from the second node, a latency requirement of the information, determine, based on the latency requirement of the information, whether to forward the information to a third node, and forward, to the third node, the information based on a determination that the information is forwarded to the third node, wherein the latency requirement is obtained, from the second node via a physical layer signaling and the latency requirement is associated with a time offset between a time at which the second node transmits the information to the first node and a time at which the information is generated at the second node, wherein in case that the information is obtained multiple times from the second node, the latency requirement is determined based on a last transmission of the information, and wherein in case that the latency requirement is lower than a threshold, the information is forwarded to the third node without decoding, and in case that the latency requirement is higher than the threshold, the information is forwarded to the third node after decoding.

7. The first node of claim 6, wherein when the latency requirement is indirectly indicated, and the processor is further configured to:

obtain transmission latency indicated by the second node, and determine a basic latency requirement of the information received from a higher layer of the second node or the first node, the transmission latency comprising the time offset between the time at which the second node transmits the information to the first node and the time at which the information is generated at the second node, and determine the latency requirement of the information based on the basic latency requirement and the transmission latency.

8. The first node of claim 6, wherein the processor is further configured to at least one of:

forward, to the third node, the information, wherein a time of a forwarded initial transmission does not exceed the latency requirement, forward, to the third node, the information, wherein a time of at least one of a forwarded first N transmissions or retransmissions does not exceed the latency requirement and N is a positive integer value, or forward, to the third node, the information, wherein a time of at least one of a forwarded total transmission or retransmission does not exceed the latency requirement; and wherein the processor is further configured to:

forward the information to the third node without decoding after receiving the information when the latency requirement meets a given first interval, and forward the information to the third node after the received information is decoded successfully when the latency requirement meets a given second interval.

9. The first node of claim 6, wherein the processor is further configured to:

determine or adjust a parameter for selecting a sidelink resource when transmitting, to the third node, the information based on the latency requirement, wherein the parameter comprises at least one of a time window for channel sensing, an energy threshold used for determining whether to exclude resources during channel sensing, an available time range for resources used for transmission, or a time range for resource reservation, and wherein the time window for channel sensing comprises at least one of a start time point, an end time point, or a length of the time window.

10. A second node comprising:

a transceiver; and a processor operably coupled with the transceiver and configured to:

transmit, to a first node, information that is required to be transmitted to a third node, and transmit, to the first node a physical layer signaling, a latency requirement corresponding to the information that is required to be transmitted to the third node, wherein the latency requirement is associated with a time offset between a time at which the second node transmits the information to the first node and a time at which the information is generated at the second node, wherein in case that the information is transmitted multiple times from the second node to the first node, the latency requirement is determined based on a last transmission of the information, and wherein in case that the latency requirement is lower than a threshold, the information is forwarded from the first node to the third node without decoding, and in case that the latency requirement is higher than the threshold, the information is forwarded from the first node to the third node after decoding.

\* \* \* \* \*